Jan. 14, 1964     G. H. BALDING     3,118,128
ELECTRONIC VISUAL CUE GENERATOR
Filed March 21, 1960     8 Sheets-Sheet 1
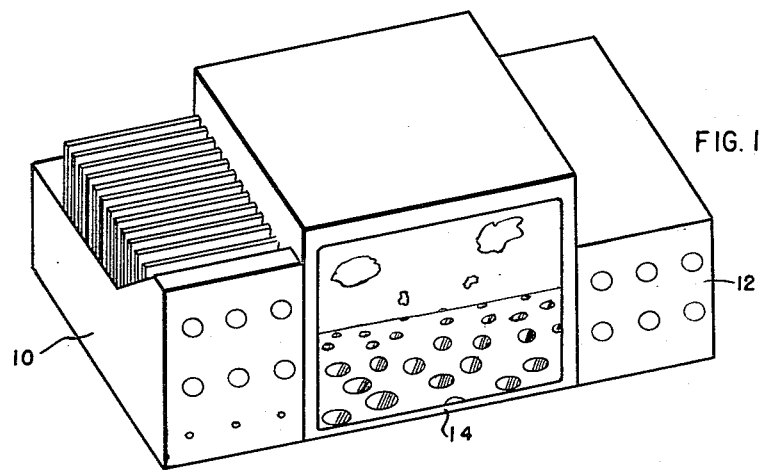
FIG. 1
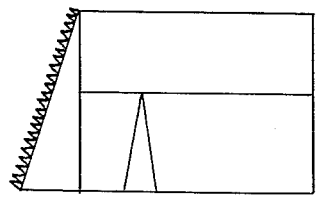
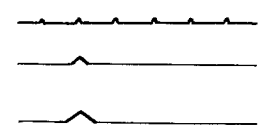
FIG. 3A
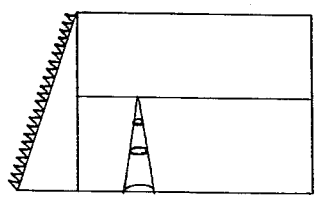
FIG. 3B
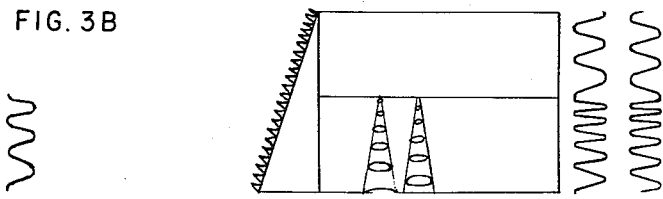
FIG. 3E
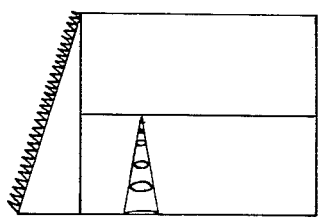
FIG. 3C     FIG. 3D
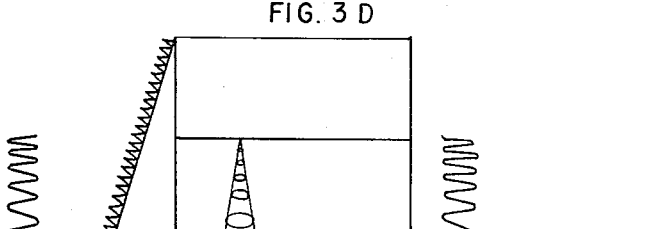
HOR. LINE (PREV. TRACE)
*INVENTOR.*
GEORGE H. BALDING
BY *Brown Jackson Boettcher & Dienner*
ATTYS.

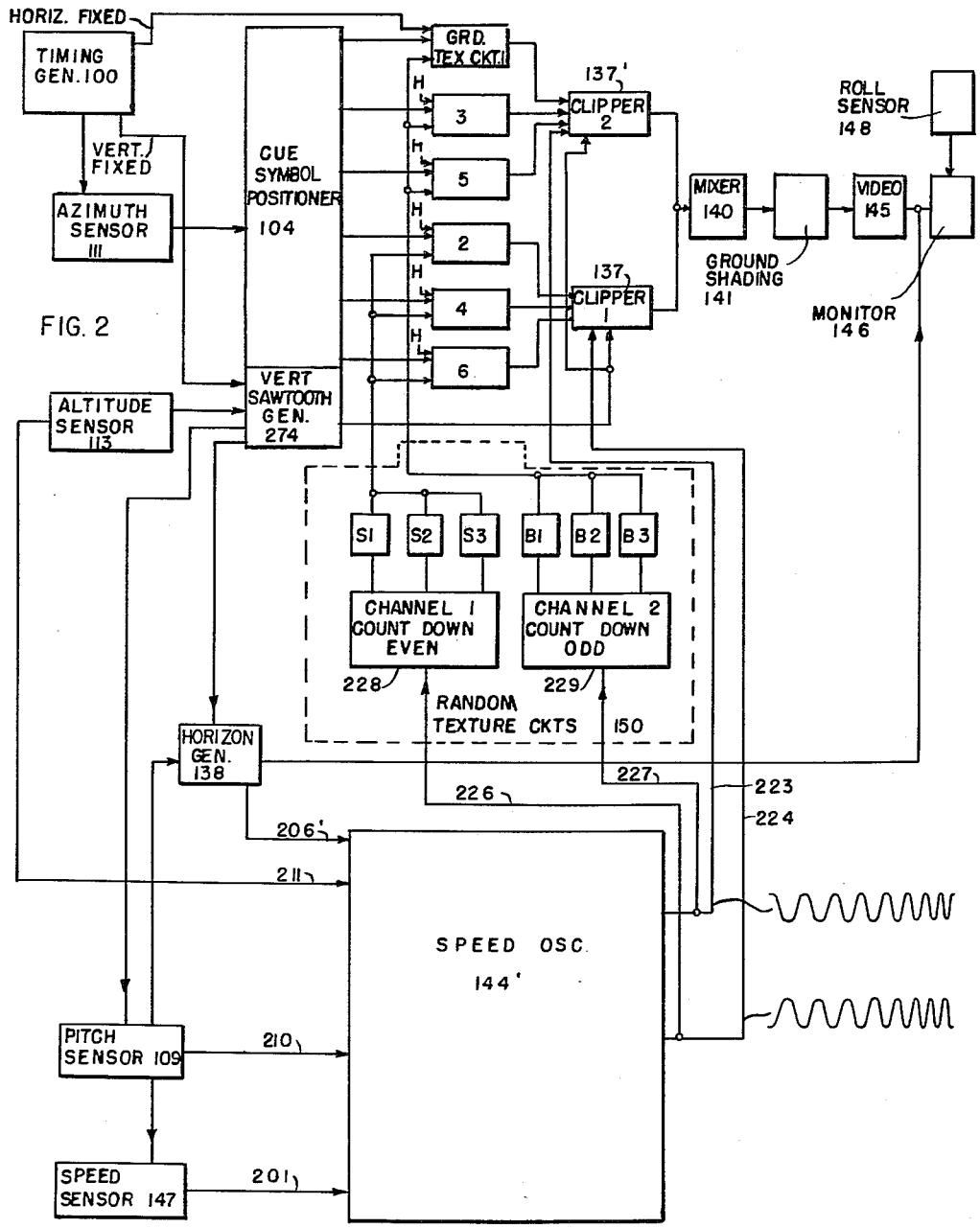

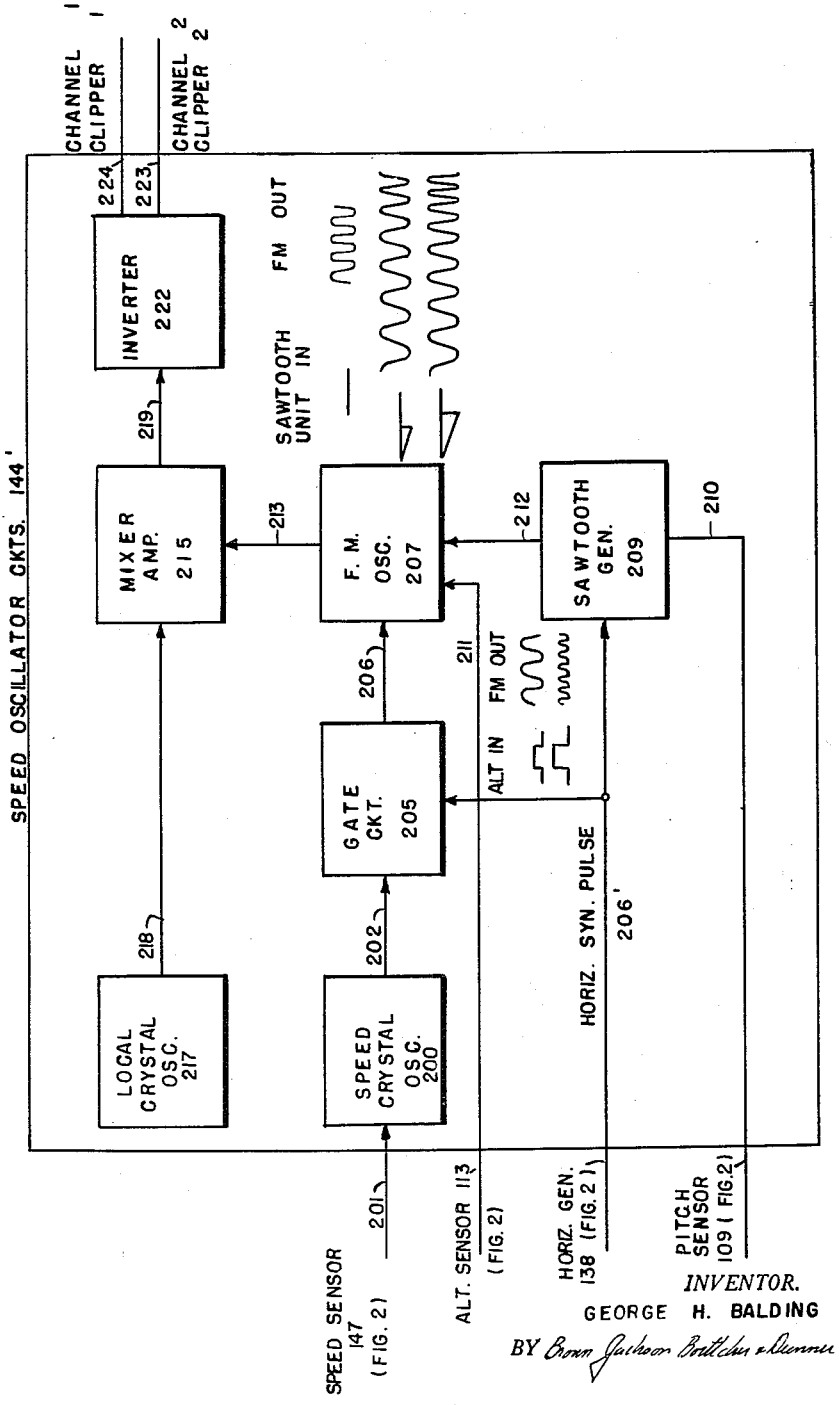

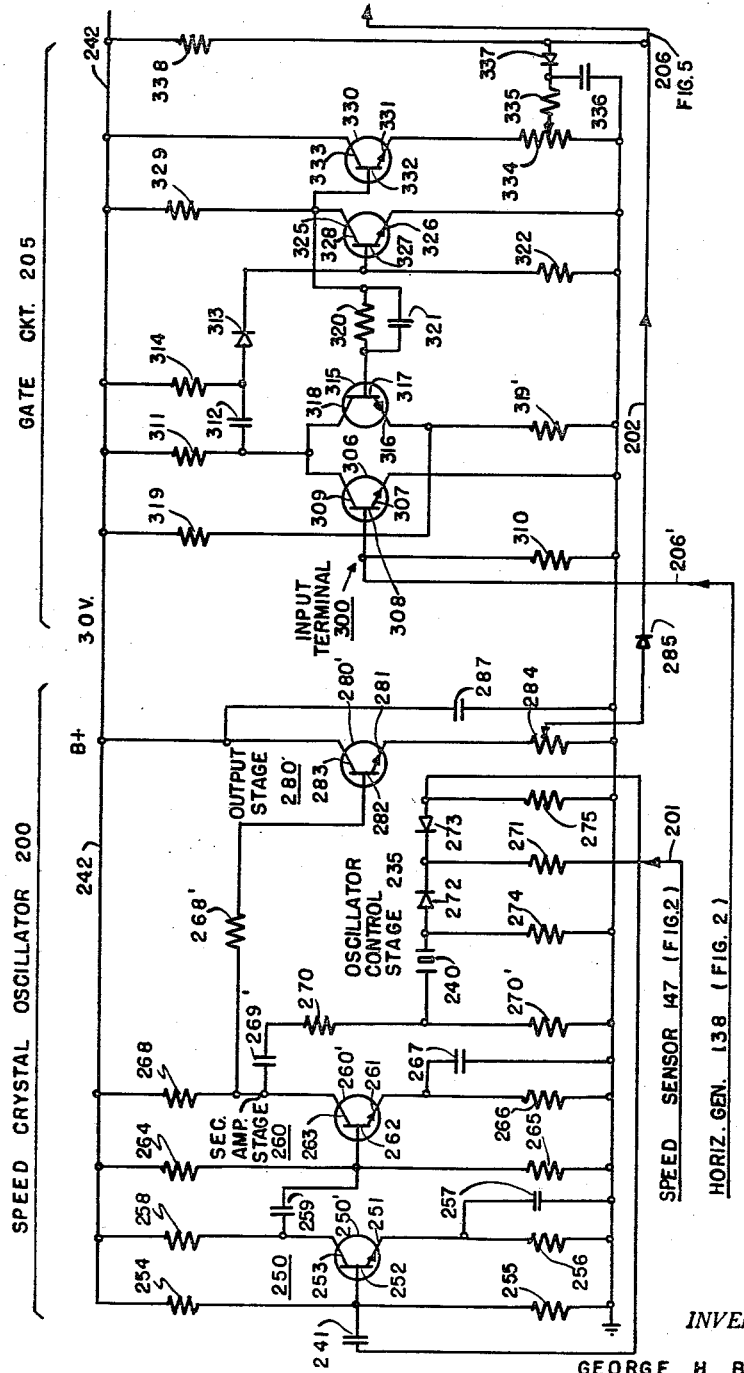

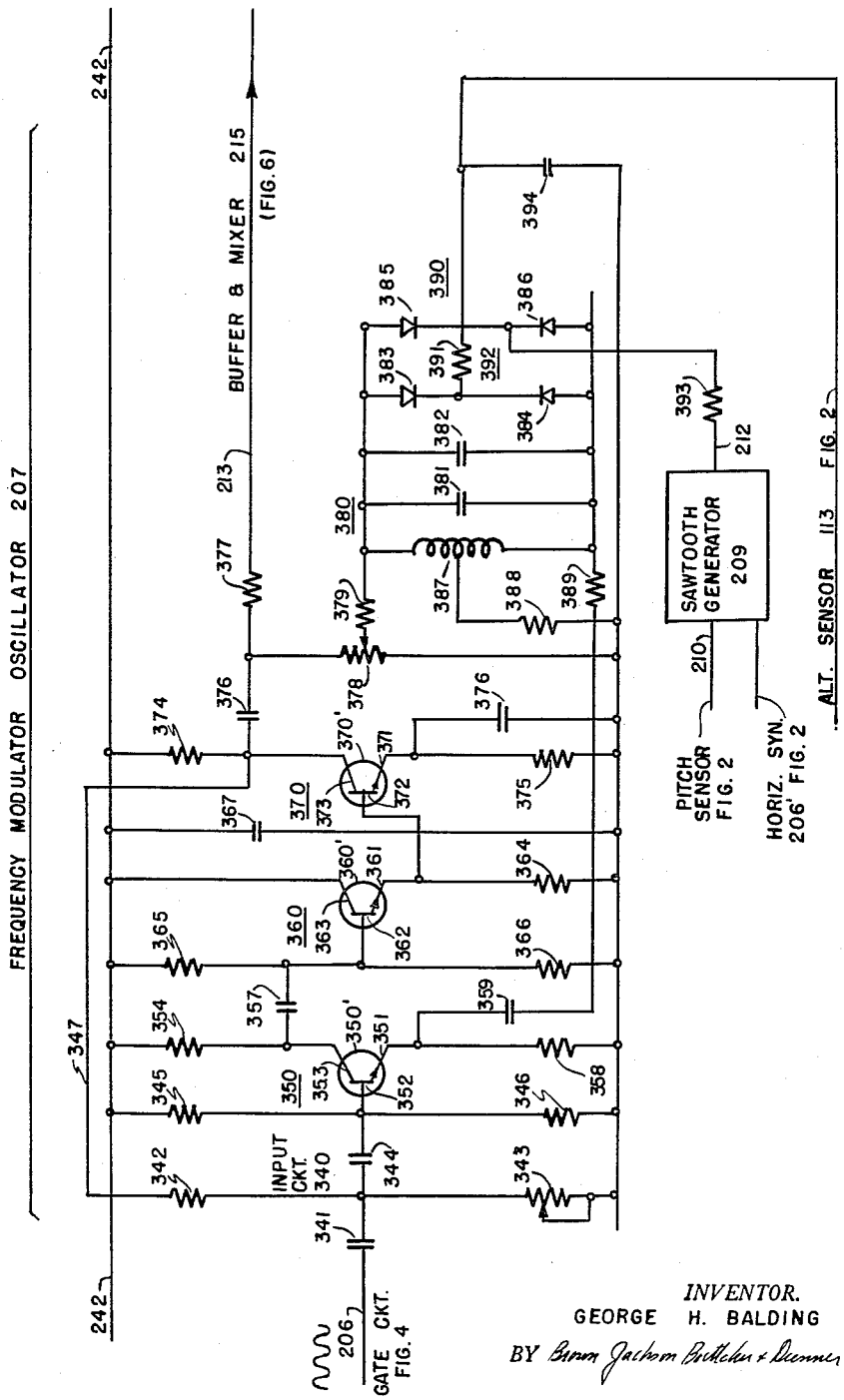

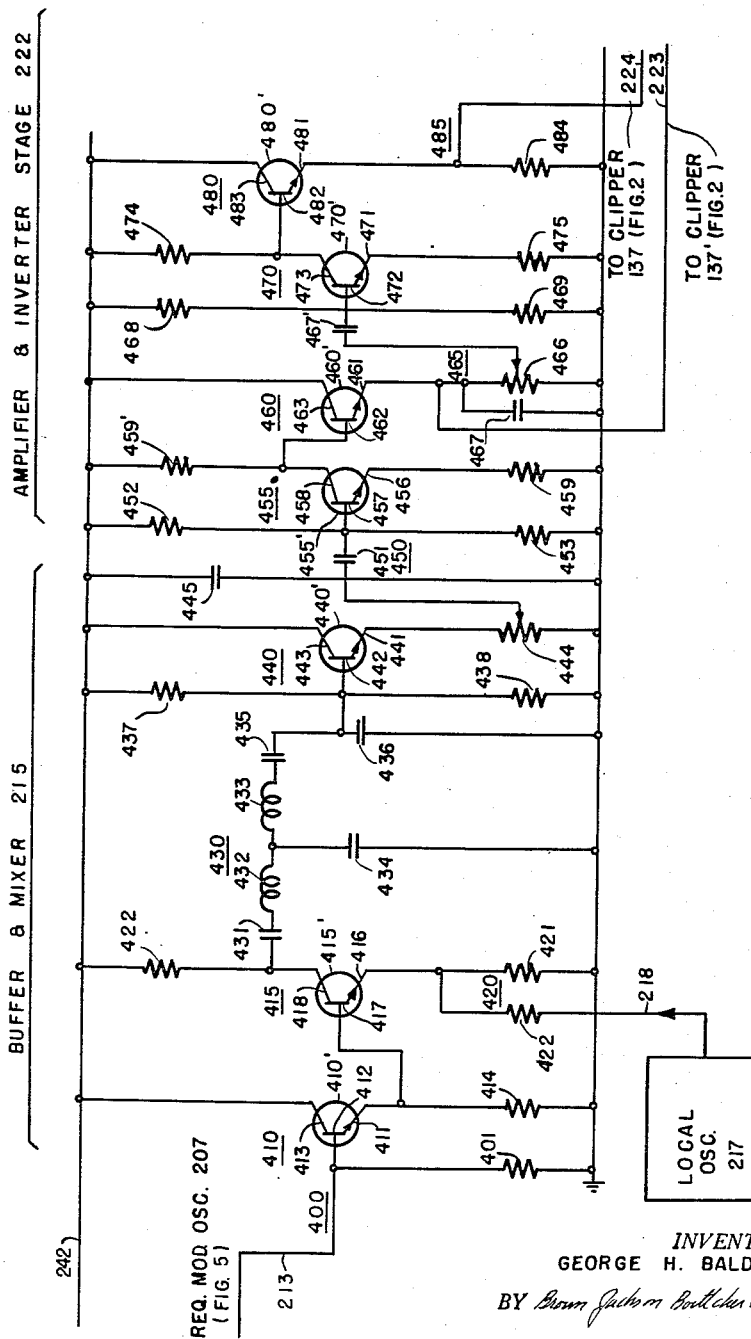

INVENTOR.
GEORGE H. BALDING

ATTYS.

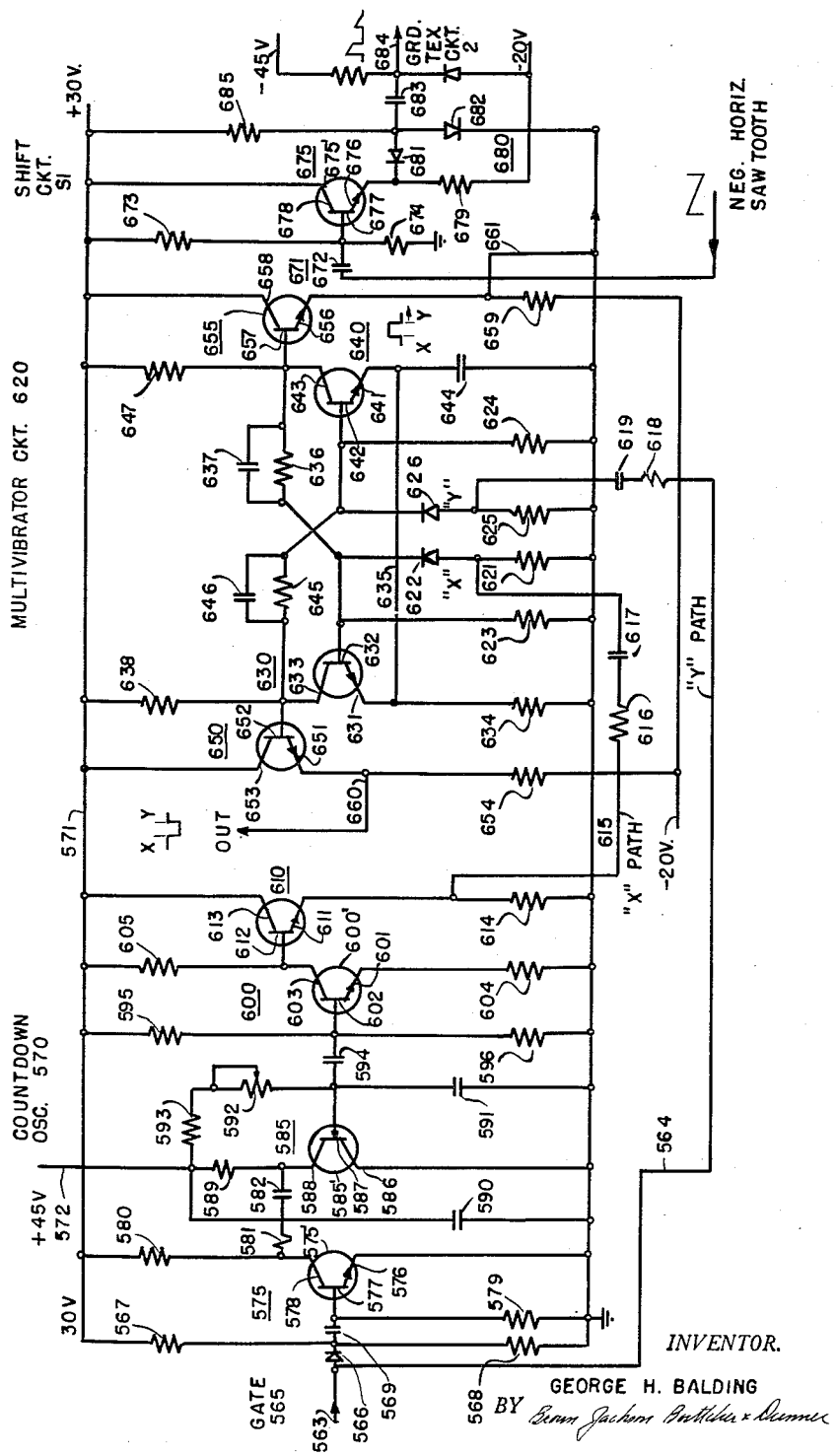

3,118,128
ELECTRONIC VISUAL CUE GENERATOR
George H. Balding, Niles, Calif., assignor to Kaiser Industries Corporation, Oakland, Calif., a corporation of Nevada
Filed Mar. 21, 1960, Ser. No. 16,438
30 Claims. (Cl. 340—27)

The present invention relates to a visual cue generator for providing an integrated display of information relating to the flight condition of an aircraft, and particularly to an all electronic system for generating such display.

As a result of the increasing speeds of newly developed aircraft, there has been a distinct need in the field for the provision of a device which will provide complex dynamic artificial displays of flight information in a single-integrated display whereby continuous reliable representations of true world conditions are provided for the aircraft pilot in a manner which requires a minimum of translation by the pilot. That is, in most arrangements known today in the art, the information is normally displayed on a large number of separate meters and indicators which are mounted in tandem or side-by-side relation on an instrument panel for viewing by the pilot. Although the readings on the instruments are relatively simple, the act of reading and translating each of the indications from the dial reading into a meaningful physical quantity constitutes a time consuming operation which becomes more and more critical in high speed craft. As a result of such problem, extensive research studies have been conducted, and it has been determined that there is a definite need in the field for a display arrangement which presents information depicting the flight condition of the aircraft in a single integrated display, and particularly in a display which is compatable with, and related to, the real world information.

A new and novel device for electronically generating complex electronic signals which are operative as coupled to the signal input means of a display device, such as the input circuit for the electron gun of a cathode ray tube, to provide a "contact analog" display, and which is particularly adapted to provide such information as relates to the speed, altitude, azimuth, pitch and roll attitude of a moving object, such as an aircraft, as well as flight path representations which enable the pilot to maintain a desired or indicated programmed path, was set forth in the copending application which was filed on April 11, 1958 by George H. Balding, and which received Serial No. 728,019, and which was assigned to the assignee of the present invention, and the present application is considered to be a continuation-in-part thereof. The novel device has similar application in providing integrated data relating to such information for other mobile objects, such as tanks, submarines, etc., and in simulator training devices, which are used to simulate flight conditions for the purpose of training aircraft pilots and the like.

The cue presentation which assists in the display of the desired information in such arrangement includes a sky pattern, a horizon and a ground texture which relates to real world conditions, and stop motion photographs of the animated displays are shown in FIGURES 1–11 of such application. Briefly, the display for level flight as there shown comprises a sky portion of a comparatively light intensity, the ground portion of the display as it extends from the dark horizon toward the bottom marginal edge of the display being of a successively lighter intensity, and a series of rows of elliptical mounds and holes being superposed on the ground surface portion of the display.

The ground texture includes three major rows and two minor rows of mounds and holes, the holes in the three different rows being in lateral alignment across the face of the display. Motion of the aircraft relative to the ground is represented by movement of the hole symbols in each row from the horizon across the ground portion of the display in the direction of the lower marginal edge of the display, the symbols increasing in size during such movement toward the bottom edge of the display. The altitude of the aircraft is represented by the relative spacing of the symbols, the symbols being farther apart as the aircraft is closer to the ground and being closer together as the aircraft is at a higher altitude.

Maneuvering of the aircraft about the roll axis, as for example, banking of the aircraft in the execution of a turn results in tilting of the horizon lines (as well as the symbols which set forth the other information) from the horizontal by an angle which is consistent with the degree of bank of the aircraft. In a similar manner, pitch of the craft is represented by displacement of the horizon line and associated display information towards the top or bottom of the display, the horizon line being displaced toward the upper edge of the display as the aircraft is maneuvered into a diving attitude and toward the lower edge of the display as the aircraft is maneuvered into a climbing attitude.

As the heading of the aircraft is changed, the rows of hole symbols move laterally across the display in a direction consistent with the direction of change so that with the arrival of the plane at a different heading new rows of ground texture holes extend across the ground texture portion of the display.

The novel arrangement further includes a flight path which is superpositioned on the visual cues, and which is variable as to position, shape, size, etc., to permit the flight direction or programming along any desired path. The arrangement includes many other display criteria including indication of displacement of the craft from a programmed flight path, terrain and weather conditions, speed symbols, optimum speed symbols and others.

The display arrangement of such device constitutes a definite step forward in the art in the provision of information in a single integrated display, and the present disclosure is directed to an improvement in a display arrangement of such type, and particularly to an improvement in the presentation of ground texture display symbols. That is, as noted above, the ground texture display in such arrangement comprises a number of rows of holes, the holes of the different rows being disposed in lateral alignment with each other, and being moved down the screen from the horizon in the direction of the lower edge of the display screen in an aligned relation. It appeared as the result of various tests and experiments that in certain applications the movement of the symbols or elements in a fixed pattern across the screen for extended periods of time might result in visual fatigue, and it is an object of the present invention therefore to provide a novel circuit arrangement which is operative to provide a ground pattern which has a random texture, and particularly a random texture which permits extended viewing without resulting in eye fatigue.

It was further observed that the representation of motion in such arrangement would be more realistic if motion perspective were included in the movement of the ground symbols across the display from the horizon to the bottom marginal edge. That is, instead of moving the elements from the horizon toward the bottom edge at a constant rate of speed, true world conditions would be more accurately represented in an arrangement in which the distance between successive elements or symbols in each row diminishes at locations which are closer to the horizon, and further in which the speed of the elements increases in their progression from the horizon in the direction of the lower marginal edge of the display. It is a further object of the invention therefor to provide a novel circuit arrangement which effects the provision of motion perspective in a display, and which particularly effects the displacement of the ground symbols relative to each other on different portions of the pattern at different distances to provide the effect of motion perspective.

The foregoing objects and features of the invention and others which are believed to be new and novel in the art are set forth in the following specification and drawings in which:

FIGURE 1 is a perspective view of the novel display apparatus and generator equipment of the invention;

FIGURE 2 is a block schematic diagram of the electronic generator circuits which are operative to provide the displays, such as that shown on the display device of FIGURE 1;

FIGURES 3A-3E are illustrative views of the waveforms which are generated by the circuits of FIGURE 2 to provide different sets of information on the display device;

FIGURE 3F is a block schematic diagram of the speed oscillator circuit, and FIGURES 4, 5 and 6 are detailed circuit diagrams of the speed oscillator circuit shown in FIGURE 2;

FIGURE 8 is a detailed circuit diagram of the random texture generator circuits shown in FIGURE 7A.

*General Description*

Figure 7A:
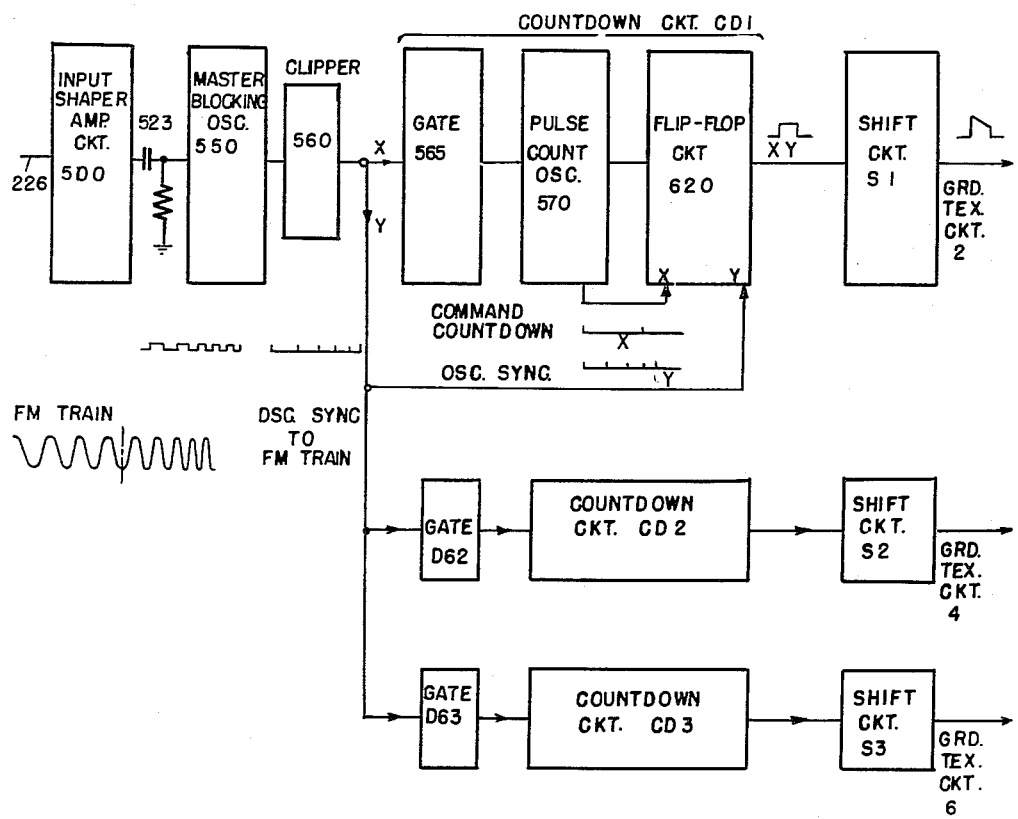
FIGURE 7A is a block schematic illustration of the electronic circuits for generating signals to provide a random texture effect for the ground pattern of the display.

The novel contact analog as shown in FIGURE 1 basically comprises an electronic visual cue generator unit 10 and a roll adapter unit 12 which are operative responsive to the application of information representative signals thereto by associated sensor equipment to provide the presentation of such information in an integrated display on a suitable display device such as, for example, a monitor unit 14. The display generator unit 10 and roll adapter unit 12 are transistorized, and as shown in FIGURE 1 the circuit components are assembled on vertically stacked, spaced cards, whereby a package of relatively small weight and size is provided. The mounting arrangement further permits ready maintenance of the equipment, and the solid state nature of the components naturally reduces the effects of shock and vibration.

The more basic ones of the representations which are provided by visual cue generator unit 10 include aircraft speed, altitude, pitch, roll and azimuth representations which are integrated in, and relative to, an electronically produced sky horizon and ground pattern. As shown on the display presentation on the monitor unit 14 in FIGURE 1, the generated ground pattern in the present arrangement comprises a random pattern of holes comprised of a plurality of symbols which are elliptical in form, and which have segments thereof shaded to indicate the heading of the aircraft. The distance between symbols (along the vertical axis of the display) increases progressively as the symbols move from the horizon toward the lower edge of the display, and the speed of movement of the symbols across the ground portion of the display increases progressively as the symbols approach the bottom marginal edge of the display.

The novel electronic circuitry for providing a display including the random pattern and motion perspecitve of FIGURE 1 is set forth in block form in FIGURE 2, the ones of the circuit elements represented by the blocks which are operative in the manner of use known with the system of the copending application being identified by the same numerals to permit a more ready identification of the portions of the system which are considered to be new and novel herein, and to facilitate reference to the elements known in the disclosure of the copending application.

As shown in FIGURE 2, the basic display representations are provided by an azimuth sensor 111 which generates azimuth representative signals, an altitude sensor 113 which generates altitude representative signals, a pitch sensor 109 which generates pitch representative signals, a speed sensor 147 which generates speed representative signals, and a roll sensor 148 which generates roll representative signals.

A timing generator 100 provides horizontal and vertical sync pulses to synchronize the operation of the various stages relative to the display raster, the basic timing signals comprising a horizontal sync pulse which is provided at the rate of 15,750 cycles per second, and a vertical sync pulse which is provided at the rate of 60 cycles per second. In the interests of simplifying the drawing the inputs of the various stages which are energized by a horizontal sync pulse of the timing generator 100 are identified by the letter H, and the inputs of the stages which are energized by a vertical sync pulse output are identified by the letter V, such signals being derived from the timing generator 100.

The ground pattern is basically provided by indicator generator circuit means including a plurality of ground texture delay circuits 1-6, and a speed oscillator circuit 144'. Each of the ground texture circuits 1-6 comprises a pulse circuit 101 and triangle generator circuit 105 (as shown in detail in the embodiment of the copending application) which are controlled by the timing generator 100 and cue symbol positioner 104 to provide triangular shaped output signals which are time synchronized with the raster trace, and which in turn provide ground symbols at different positions on the display screen.

As in the previous embodiment, each ground texture delay circuit 1-6 provides one row or path from which symbols are derived, the width and position of which paths are basically determined by the output signals of the azimuth and attitude sensors 111 and 113. That is, with changes in altitude, the altitude sensor 113 is operative to couple a variable bias signal to the vertical sawtooth generator 274 to vary the amplitude of the output waveform, the value of the bias being such that the paths of symbols generated by the circuits are narrowed as the altitude increases and widened as the altitude decreases.

With a change in azimuth, the azimuth sensor 111 and cue symbol positioner alters the signal output of the ground texture circuits 1-6 in time to adjust the paths of symbols laterally in a direction consistent with the direction and degree of the turn. With a change in pitch of the aircraft, the signal time is likewise adjusted to cause the paths to move apart or closer together, and simultaneously to adjust the angular relation of the outer paths relative to the center paths to thereby vary the perspective pattern of the ground surface.

In the previous embodiment, a sine wave oscillator 144 provided sine waves of a given frequency for the purpose of modulating the output of the clipper circuit, and specifically to break the paths into rows of elliptical symbols. In the present arrangement the speed oscillator 144' provides sine wave pulses to provide elliptical symbols in a similar manner, and further provides random texture circuits 150 for modifying the signal generation by each of the ground texture circuits 1-6 to thereby create a quasi-random pattern on the display.

More specifically, as shown in FIGURE 2, the ground texture circuits 1-6 are divided into two groups or channels, the first group comprising ground texture circuits 2, 4, 6 (Channel 1) and the second group being comprised of ground texture circuits 1, 3, 5 (Channel 2). The signal output of the ground texture circuits 2, 4, 6 in Channel 1 are coupled to clipper 137, and the signal output of the ground texture circuits in Channel 2 are coupled to clipper 137', the output of the clippers 137 and 137' being coupled over mixer circuit 140 to ground shading circuit 141 and video amplifier 145 to monitor device 146.

As illustrated by the waveforms in FIGURE 2, speed oscillator 144' couples a first set or train of frequency modulated sine wave signals to the clipper circuit 137, and a second set or train of frequency modulated sine wave signals to clipper circuit 137' for the purpose of breaking the paths into separate symbol elements, the variable frequency rates of the pulses in each train effecting a difference in the spacing between the symbols in each row, the symbols in a row which are near the horizon being more closely spaced than the symbols which are closer to the bottom marginal edge of the display. The first frequency modulated sine wave output provided by speed oscillator circuit 144' is extended over conductors 223 to clipper 137', and the second frequency modulated sine wave frequency waveform is extended over conductor 224 to clipper 137, the two waveforms being 180 degrees out-of-phase to effect an adjustment in the relative position of the pulses output from Channels 1 and 2, and thereby the position of the symbols in adjacent rows on the display.

Speed oscillator 144' also couples the first set of output signals over conductor 226 to a speed countdown circuit 228 in Channel 1 which controls a plurality of shift circuits S1, S2, S3 to couple signals to the ground texture circuits 2, 4, 6, respectively for the purpose of blanking, shifting or altering the size of the symbols created by the output signals thereof. The speed oscillator 144' couples the second signal set output over conductor 227 to the speed countdown circuit 229 in Channel 2 to control shift registers B1, B2, B3 to couple signals to the ground texture circuits 1, 3 and 5 to effect shifting, blanking and size adjustment of the symbols generated by the ground texture circuits 1, 3 and 5. The manner in which the random texture circuitry 150 effects such operation is described in more detail hereinafter.

The output of the speed oscillator circuit 144' is further modified by speed sensor equipment 142 which couples signals of different values over conductor 201 to the input of speed oscillator circuit 144' to vary the rate of oscillation of the oscillator circuit 144' with changes in speed. With a shift in the frequency output of the oscillator circuit 144', the repetition rate of the output waveform train is modified relative to the frequency of the vertical sweep of the display, and as a result, the symbols appear at a slightly different position on the display device in each successive raster trace. In that the trace repetition is at a fairly high frequency relative to the viewer, the symbols appear to move across the display, and adjustment of the frequency of oscillator circuit 144' to different values with changes in speed of the aircraft provides a change in the relative rate of movement of the symbols across the display, and thereby a visual indication of changes in the speed of the aircraft.

The signal output of speed oscillator 144' is further controlled by pitch sensor 105. That is, as the pitch of the aircraft varies, pitch sensor 109 couples vertical sawtooth signals of correspondingly different values over conductor 210 to the speed oscillator 144 to vary the frequency output of the oscillator circuit in each train of pulses, and thereby the spacing between successive sine waves in the train.

The signal output of the speed oscialtor 144' is also controlled by the altitude sensor 113. That is, with a change in altitude, a different value bias signal is coupled to the speed oscillator 144' and the frequency of the sine waves is adjusted to different values to effect a corresponding change in the size of the symbols which appear on the display device.

A horizon generator 138' is controlled in its operation by the pitch sensor 107, and is synchronized with the system by the vertical sync output pulses of timing generator 100. The horizon generator 138 basically provides a pulse having a sharp leading edge, the time of occurrence of the leading edge in a raster scan determining the location of the horizon line on the display, and in turn, being controlled by the pitch sensor output. The trailing portion of the output wave of the horizon generator 138 is mixed with the output signals of video amplifier 145 and coupled to the monitor device 146.

Roll sensor equipment 148 is operative with rotation of the aircraft about its roll axis to couple signals indicative of the change in roll attitude to the deflection yoke of the display device 146, to thereby effect a corresponding mechanical adjustment of the horizon line from the horizontal. Such adjustment may also be effected electronically, if desired.

The information representative symbols which are generated by the block circuits of FIGURE 2, and the manner of generation will be apparent by brief reference to the illustrations of FIGURES 3A–3E. With initial reference to FIGURE 3A, it will be apparent that each of the ground texture circuits 1–6 generates a triangular waveform output in each line trace (see waveforms in upper line, right hand edge of display) to provide (in the absence of signals from the random texture circuits and the speed oscillator circuit 144) six spaced triangular pulses in each line trace. As shown by the waveform adjacent the left edge of the display of FIGURE 3A, the horizontal signals are mixed with the vertical sawtooth output of sawtooth generator 274. Six pulses are, of course, generated during each line trace of the raster but, assuming level flight conditions (in which the horizon line should extend across the middle of the display), the horizon line generator circuit 138 will be operative to provide a control signal which blanks out the portions of the waveform on the display which would occur above the horizon line on the display, and the first ground symbol will therefore appear on the display immediately below the horizon line trace.

It is further apparent with reference to such set of line trace representations that the widths of the triangle pulses increase during the successive line traces which occur below the horizon line on the display, and that consequently the duration of the trace resulting from each pulse in a line trace is larger in the line traces which occur below the horizon line successively closer to the lower marginal edge of the display. Thus as shown in the three representative line traces of FIGURE 3A, the pulse width increases progressively in successive line traces below the horizon line to thereby provide a path of increased width at the lower marginal edge of the screen. For purposes of a more explicit disclosure the display of FIGURE 3A only illustrates the second path of the six which would be provided by the output pulses of the ground textile generators 1–6.

With reference to FIGURE 3B, it will be apparent that if the waveform output of a constant frequency sine wave oscillator is coupled to the clipper circuits 137, 137', the paths will be broken into a plurality of elliptical symbols which are spaced equidistantly relative to each other. As indicated heretofore, if the frequency of the waveform is a harmonic of the vertical frame repetition rate the elements will be motionless. Further if the frequency of the sine wave is shifted slightly from a harmonic of the vertical frame repetition rate, the location of the symbols during successive raster traces will be altered and the appearance of motion of the symbols is provided. Such manner of presentation is described in more detail in the aforeidentified copending application.

Motion Perspective

As noted above, the object of the invention is to provide a display in which the moving ground symbols are randomly displayed, and in which the symbols are more closely spaced relative to one another at the horizon and are less closely spaced as the pattern approaches the lower edge of the display.

Such feature is basically accomplished herein by providing a train of frequency modulated sine wave pulses which pulses are of progressively increasing frequencies in the train length, and coupling such form of wave trains to the ground texture clipper circuits 137, 137', whereby the shape, vertical spacing and number of the ground texture elements in a given row is a function of the train of frequency-modulated sine waves which is introduced into the clippers by speed oscillator 144'. As in the previous embodiment, if the frequency of the speed oscillator is a harmonic of the vertical frame repetition rate, the elements will be motionless, and if the frequency of the sine wave is shifted slightly from a harmonic of the vertical frame repetition rate a corresponding degree of motion of the symbols will occur.

In the specific display system, it was found that a more accurate representation of certain "true world" conditions is effected with changes in pitch of the aircraft if the raster trace is effected from the bottom toward the top of the display (rather than by the conventional method of tracing from the top to the bottom of the display). Since the trains of impulses are synchronized with the horizon line, and the trace is initiated from the bottom of the raster, the FM pulses which occur during the portion of the trace which includes the ground texture (the lower portion of the display) must be successively closer as the trace approaches the horizon line to provide the desired perspective. As a result the pulses of the FM pulse train are initially generated at a lower frequency and the frequency is increased as the FM train progresses. Such arrangement is shown in FIGURE 3C, the FM train there illustrated beginning at the line of trace of the horizon line in one reverse raster trace (not shown) and terminating in the subsequent raster trace which is shown in the display of FIGURE 3C. It is readily apparent to parties skilled in the art that with a conventional raster trace the FM wave form of the FM train as generated by the speed oscillator 144' would merely be reversed.

As shown in FIGURE 3D if such train of impulses is provided with motion relative to the speed of the vertical trace, the symbols will be moved to a correspondingly different position during the next raster trace, and the illusion of motion of the symbols from the horizon in the direction of the viewer will be accomplished.

It will be further apparent with reference to FIGURE 3E, that coupling to one clipper such as 137' (Channel 2) of an inverted form of the wave train which is coupled to clipper 137 (Channel 1) will provide a corresponding displacement of the symbols which are displayed in adjacent rows.

With reference to FIGURE 3F, the novel speed oscillator circuitry 144' for providing the novel frequency modulated pulse trains to the clipper circuits for Channels 1 and 2, and the resultant motion perspective in the display, is set forth in block form thereat. As there shown, the arrangement basically comprises a 31.260 kc. speed crystal oscillator 200 having an input circuit 201 for receiving the signals which are representative of the speed of the craft from the speed sensor 147 (FIG. 2), and an output circuit 202 over which sine wave signals are coupled to a gate circuit 205 at a frequency which is related to the value of the speed representative signals which are coupled thereto. Gate circuit 205 is controlled by the horizon sync pulses received over conductor 206' to effect gating of the output pulses of the speed crystal oscillator 200 over conductor 206 to a frequency modulation oscillator 207.

In that the operation of the FM oscillator circuit 207 is controlled by the gate circuit 205 which is in turn controlled by the horizon sync signal, the leading end of each train of FM pulses is locked to the horizon line as shown in FIGURES 3C and 3D. The output of the FM oscillator (in the absence of other control signals) will thus comprise a train of impulses which are generated at a frequency rate determined by the sine wave pulse output of the 31.260 kc. speed crystal oscillator 20, and which are initiated and locked to the horizon line by the gate circuit 205.

The FM oscillator circuit 207 is further controlled in its operation, however, by the signals representative of the aircraft altitude which are received over conductor 211 from the altitude sensor circuit 113 and by the waveform output of a sawtooth generator 209, which is, in turn, controlled by signals representative of the pitch which are received over conductor 210 from the pitch sensor 109 and the horizon sync signal which is received over conductor 206'.

Briefly, with the occurrence of a change in pitch of the aircraft, the amplitude of the output waveform sawtooth of the sawtooth generator 209 is varied, and the FM oscillator 207 is operative to effect a corresponding variation in the frequency of the pulses of each output train. As shown in the waveform representation adjacent the FM oscillator 207, in the absence of the coupling of a negative going sawtooth waveform by sawtooth generator 209 over input circuit 212 to the FM oscillator 207, the output pulses of the FM oscillator will be of a constant frequency as determined by the pulses gated to the FM oscillator 200. The display which results from such waveform will comprise a sine wave of evenly spaced symbols, and such condition is, of course, representative of true world conditions when the aircraft is in a vertical dive. As a negative going sawtooth is generated by sawtooth generator 209 and coupled over conductor 212 to FM oscillator 207, the initial pulses are of a lower frequency and the successive pulses of the train are of a progressively larger frequency, the difference in frequency between the impulses of the trains being increased as the amplitude of the sawtooth waveform increases. It will be apparent that in level flight, the difference in frequency between the first pulses of the train and the later pulses of the train should be at a maximum, and accordingly a sawtooth waveform of maximum amplitude is coupled over conductor 212 to FM oscillator 207 at such time.

Altitude sensor 113 (FIG. 2) is operative to couple a direct current bias signal over conductor 211 to the FM oscillator 207 which signal varies in value with variations in the altitude of the craft. With reference to the waveform adjacent conductor 211, it is apparent that as the aircraft is at a lower altitude, the signal is of a value to decrease the frequency of oscillation of the FM oscillator, and the required frequency of the pulses in the train output of the FM oscillator will result in symbols which are of a larger size and which are at a greater distance from each other. In a similar manner if the frequency of oscillation of the sawtooth generator is increased with an increase in altitude, the frequency of the pulse train is increased, and the change in the altitude is represented by symbols which will be closer together and will be of a correspondingly reduced size.

The waveform output of the FM oscillator 207 is fed over output circuit 213 to a mixer amplifier circuit 215. A local oscillator circuit 217 which generates a 31.5 kc. output is coupled over conductor 218 to mixer amplifier 215, whereby the signal output of the local oscillator 217 is heterodyned with the FM oscillator output to obtain an FM difference frequency which is coupled over conductor 219 to an inverter circuit 222. The heterodyning arrangement is included to provide a greater range of frequency for the output pulses of the train, the frequency in the disclosed embodiment ranging from approximately 1.5 kc. at the top of the screen to 240 c.p.s. at the bottom of the screen.

The output pulse train which results from the difference frequency output of the mixer 215 is fed to an inverter circuit 222 which amplifies such train, and provides a first and a second output train of impulses, the first wave train being an amplified replica of the input train and the second wave train being inverted 180 degrees relative to the first train. As shown in FIGURE 3F, the two different trains of impulses as coupled to the clippers 137, 137' respectively, result in displaced positioning of the symbols in the adjacent rows on the display.

As noted above, when the difference frequency of the mixing circuit is a harmonic of the vertical repetition rate, the waveform will be in synchronism with the vertical scan rate. Any slight change introduced in the frequency of the FM oscillator causes the beat frequency to lose synchronism, thereby creating the illusion of motion. The rate of motion can therefore be controlled by adjustment of the frequency of the speed crystal oscillator 201.

*Details of Motion Perspective Circuitry*

As noted above, the speed oscillator circuitry 144' which provides the motion perspective basically comprises a 31.5 kc. local oscillator 217, the output of which is heterodyned with the output of a frequency modulator oscillator 207 to obtain a frequency modulation difference which has a range extending from a 1.5 kc. high frequency and a 240 c.p.s. low frequency, the end point of the FM waveform being controlled by a 31.260 kc. speed crystal and the waveform output of the FM oscillator being controlled by the output signals of altitude sensor 113 and sawtooth generator 209 which is in turn controlled by the signal output of pitch sensor 109 and horizon line generator 138. The details of such circuits, and specifically, the circuits shown in block in FIGURE 3F are now set forth hereat.

With reference to FIGURE 4, speed crystal oscillator circuit 200 which provides a sine wave output at 31.260 kc. is set forth in detail thereat. As there shown the speed crystal oscillator circuit 200 basically comprises a crystal member 240 which is cut to 31.260 kc., a first and a second amplifier stage 250 and 260 which are connected to drive the crystal in an oscillatory manner, an input conductor 201 over which signals representative of the speed of the aircraft are received, a control stage 235 including a resistance 271 for coupling such signals to the junction of a first and second varicapacitor unit 272 and 273, and load resistors 274, 275, which control circuit is coupled between the crystal member 240 and the input circuit for the amplifier stages 250 and 260; and an output circuit including transistor member 280 which is connected in an emitter-follower configuration to effect coupling of the oscillating output of the amplifier stages 250, 260 over output diode 285 and conductors 202 for gating by the associated multivibrator or gate circuit 205 to FM oscillator 207.

More specifically, signals from the speed sensor 147 for the aircraft are coupled over conductor 201 to the input circuit 235 for speed oscillator 200, the variations in the speed of the craft being represented by variations in the value of a direct current bias signal which is coupled over to the input circuit 235, which in turn effects a corresponding variation of the frequency of oscillation of speed crystal oscillator 200. Input circuit 235 basically comprises an input conductor 201 and a resistor member 271 coupled to the junction point of a pair of varicapacitor units 272, 273 which are connected between the crystal 240 and a feedback circuit to the amplifier stages 250, 260. With a variation of the voltage input to the junction point of the capacitors 272, 273, the capacity thereof is varied by a corresponding value, and such change in capacitance will effect a corresponding change in the value of the signal output of the crystal 240 which is coupled over a feedback circuit and coupling capacitor 241 to the input circuit for the amplifier stages 250, 260.

The amplifier stages 250, 260 are conventional in nature, the first stage including an NPN transistor 250' having emitter, base and collector elements 251, 252, 253, respectively, base element 252 being connected to a base-bias voltage divider including resistor members 254, 255 which are connected between the B+ conductor 242 and ground; emitter 251 being connected over an R.C. circuit including resistor member 256 and capacitor 257 to ground, and collector 253 being connected over load resistor 258 to the B+ conductor 242, and also over coupling capacitor 259 to the junction of a voltage divider including resistor members 264, 265 which junction is coupled to the input circuit for the second amplifier stage 260.

The second amplifier stage 260 includes an NPN transistor member 260' including emitter, base and collector elements 261, 262, 263, respectively, the base 261 being connected to the junction of the voltage divider including resistor members 264, 265; emitter element 261 being connected over an R.C. biasing circuit including resistor member 266 and capacitor 267 to ground, and collector element 263 being connected over resistor member 268 to B+ supply conductor 242 and over resistance 268' to the emitter-follower output coupling stage 280, and also over a coupling capacitor 269' to one end of a voltage divider network including resistor members 270, 270', the junction of which is connected to one terminal of the crystal member 240.

The output coupling stage 280 includes an NPN transistor 280' connected as an emitter follower which includes emitter, base and collector elements 281, 282, 283, respectively, the base 282 being connected over resistance 268' to the output of the second amplifier stage 260, collector 283 being connected to B+ supply conductor 242, and emitter 281 being connected over variable resistor 284 to diode 285 which couples the output signals derived from the emitter stage over conductor 202 for gating purposes by gate circuit 205. Capacitor 287 is connected between the B+ conductor 242 and ground.

In operation, as power is coupled to the circuit to energize the B+ conductor 242, the energizing potential is extended over load resistor 268, and coupling capacitor 269 to the voltage divider 270, 270' to excite the crystal, which tends to ring at the cut frequency and to effect the coupling of an output signal over the varicap members 272, 273 and the feedback circuit to the input circuit for the amplifier stages 250, 260, which amplify the oscillating signal in the conventional manner, and couple the same over the coupling capacitor 269' to the voltage divider resistors 270, 270' and the input terminal of crystal 240, whereby oscillations of the circuit are effected at the rated value of the crystal (31.260 kc.). The output of the amplifier stages 250, 260 is also coupled over the emitter-follower coupling stage 280 and diode 285 to the output conductor 202.

It will be apparent that with changes in the speed of the aircraft, and changes in the value of the direct current voltage bias which is coupled over the input conductor 201 to the oscillator control circuit 235 including resistor 271 and the junction of the varicapacitors 272, 273, the capacitance of members 272, 277 varies, and the oscillator frequency output is varied in a like manner. In one embodiment the input voltage to the capacitors 272, 273 was variable from zero to negative 27 volts, and frequency output of the speed oscillator 200 changed from 31.260 kc. to 31.254 kc.

*Gating of Output Signals of Speed Oscillator 200 by Gate Circuit 205*

It will be recalled that the output of the speed oscillator circuit 200 is gated by a gate circuit 205 which is in turn controlled by the synchronous pulses of the horizon line generator 138 (see FIGURE 3F), the horizon sync signal output of generator 138 being coupled over conductor 206 to a one shot gate circuit 205 which responsively generates a square wave output, the leading edge of which indicates the initial period of time of extension of a train of output pulses from the speed oscillator to the frequency modulation oscillator 207, and the trailing edge of which establishes the termination of each train of pulses. In such manner, each train of pulses gated from the speed crystal oscillator 200 is locked to the horizon line.

More specifically with reference to FIGURE 4, the gate circuit 205 basically comprises an input terminal 300 over which the horizon sync signals received from horizon generator 138 are coupled to the multivibrator for the purpose of controlling the operation thereof. Input terminal 300 is coupled to a first transistor 306 having emitter, base and collector elements 307, 308, 309, respectively, the base element 308 being connected to the input terminal 300 and over a bias resistor member 310 to ground; emitter element 307 being connected directly to ground, and collector 309 being connected over resistor 311 to B+ supply conductor 242; and to the collector of transistor 315; and over capacitor 312 and diode 313 to the input circuit for transistor 325.

Transistor 325 includes emitter, base and collector elements 326, 327, 328, respectively, base element 327 being connected to the output circuit of transistor 309 and over bias resistor member 322 to ground, emitter element 326 being connected directly to ground, and collector element 328 being connected over load resistor 329 to B+ supply conductor 242, and also over an RC network including resistor 320, and capacitor 321 to a transistor member 315.

Transistor member 315 includes emitter, base and collector elements 316, 317, 318 respectively, the emitter element 316 being connected over a voltage divider circuit including resistor members 319 and 319'; and collector element 318 being connected to the collector circuit of transistor 306, and over resistor 311 to the B+ supply conductor 242.

The output of the multivibrator transistor members 315 and 325 is connected over transistor 330 which is connected in an emitter-follower configuration, and includes emitter, base and collector elements 331, 332, 333 respectively, the base 332 being connected to the output collector circuit of transistor 325, collector element 333 being connected directly to the B+ supply conductor 242, and emitter element 331 being connected over variable resistor member 334 to ground, the variable tap on resistor 334 being connected over a load which includes resistor 335, filter capacitor 336, diode 337 and resistor 338 to the output conductor 202 of speed oscillator circuit 200.

As noted above, the purpose of the gate circuit 205 is to gate a "train" of impulses from the speed crystal oscillator 200 with each receipt of a horizon sync pulse (indicating the trace of the horizon line on the display screen), and to terminate such train a predetermined period thereafter. In operation, as the positive-going horizon line sync signal is coupled over the input conductor 206' and input terminal 300 to the base element 308 of the first transistor 306, the potential in collector circuit 309 goes sharply negative, and the negative going pulse is coupled over capacitor 312 and diode 313 to the base 327 of the transistor 325. Transistor 325 is biased toward cutoff, and the potential in the collector circuit 328 of transistor 325 now goes positive, the positive going signal being coupled over the RC circuit including resistor member 320 and capacitor 321 to the base element 317 of the transistor 315 to further increase the conductivity thereof, and the collector circuit 318 of transistor 315 is driven even more negative.

Conduction of transistor 315 continues to increase toward saturation, and the transistor thereafter remains in the saturated condition for a period which is determined by the value of the components in the RC network comprising capacitor 312 and resistor 314. That is, as transistor 315 reaches saturation, capacitor 312 begins to discharge over resistor 314, and the positive going waveform which results therefrom is coupled over diode 313 to the base 327 of transistor 325 to bias same toward conductivity, and the potential in the collector circuit 325 goes sharply negative.

Thus with the coupling of the sync pulse to the first transistor 306 the transistor 325 is driven toward cutoff to provide the leading edge of an output square wave pulse in the collector circuit 328, and the transistor 325 is held non-conductive for a period determined by the RC constant of capacitor 312 and resistor 314. As such time period expires, transistor 325 is biassed to conduct as described above, and the trailing edge of the generated square wave pulse appears in the collector circuit thereof.

The square wave output pulse which is thus generated is coupled to the base element 332 of the transistor 330 (which is connected in an emitter follower configuration) and the square wave pulse is consequently coupled across resistors 334, 335 and diode 337 to the gating conductor 202 for the speed oscillator circuit 200. During the period that the positive square wave pulse is coupled to conductor 202, rectifier 285 is conductive and the sine wave output of the speed oscillator circuit 200 is coupled over the output circuit 202 and rectifier 285 to the output conductor 206.

In one embodiment the output of the speed oscillator circuit 200 was gated by a one millisecond pulse which was coupled over to the diode 285, the pulse occurring at the vertical repetition rate to form a train burst of sine wave pulses at 31.26 kc. which has a duration of one millisecond.

FM Oscillator 207

The pulse train thus generated is coupled over conductor 206 to the FM oscillator circuit 207 (FIG. 5), the train being coupled to the FM oscillator at a time when the oscillator is oscillating at 31.26 kc. (just after the flyback of the modulated wave), whereby the two oscillations are phase locked.

It will be recalled that the FM oscillator is controlled to provide frequency modulated trains of pulses, and is basically controlled to oscillate by the train of sine wave pulses output from the speed crystal oscillator 200 which is coupled thereto in synchronism with the horizon line sync pulse. The manner of modulation by the frequency modulation oscillator 207 is in turn varied with changes in the value of the pitch and altitude of the aircraft, as shown in more detail hereinafter.

The FM oscillator 207 which is shown in detail in FIGURE 5 basically comprises an input circuit 340 for coupling the output pulse trains of the speed oscillator 200 to the frequency oscillator 207, three high gain amplifier stages 350, 360, 370 with a bridge T rejection network 380 which forms a negative feedback loop for oscillator 207 for the purpose of assuring frequency stability. Control circuits 390 and 392 couple signals to the bridge network to effect variation of the capacitance or inductance of the network 380 and thereby alter the frequency response of the rejection network, and the frequency of the signal output of the FM oscillator 207. As shown in FIGURE 5, variations in the LC constant of the network 380 (and thereby the frequency output of the FM oscillator 207) are effected by coupling a variable voltage direct current signal, and a variable amplitude sawtooth waveform to the network to provide a variable bias for the FM oscillator. With changes in pitch of the aircraft, for example, the amplitude of the sawtooth waveform coupled over input circuit 392 is varied to effect a corresponding variation in the degree of frequency modulation in each pulse train and thereby variation in the spacing between the different pulses in the train. When variations in altitude, different direct current voltage values are coupled over input circuit 390 to network 380 to effect a corresponding change in the frequency output of the FM oscillator, and a related change in the size of the symbols on the display.

In more detail (with reference to FIGURE 5) the input circuit for FM oscillator 207 over which the sine wave output of the speed crystal oscillator 200 is gated by the gate circuit 295, basically comprises a coupling capacitor 341, an adjustable bias resistor member 343, a coupling capacitor 344, and a voltage divider including resistance members 345, 346 for coupling the sine wave train output of the speed crystal oscillator 200 to the first amplifier stage 350. A feedback loop 347 including resistance 342 is coupled from the third stage 370 back to the input circuit 340 and the junction point of capacitors 341, 344 and variable resistor 343.

The first amplifier stage 350 includes a transistor 350′ having emitter, base and collector elements 351, 352, 353, respectively, the base 352 being coupled to the input circuit 340; and over the base bias resistors 346 to ground and over resistor 343 to the feedback loop 347; collector 353 being connected over resistor 354 to B+ conductor 242, and over coupling capacitor 357 to the second amplifier stage 360; and emitter 351 being connected over resistor bias member 358 to ground, and also over coupling capacitor 359 to a feedback circuit which extends thereto from the LC network 380.

The second transistor amplifier stage 360 includes a voltage divider input circuit including resistors 365, 366 coupled between B+ supply conductor 242 and ground for coupling the output of the first stage 350 to the transistor 360′ of the second amplifier stage 360. Transistor 360′ comprises emitter, base and colector elements 361, 362, 363, base element 362 being connected to the output circuit of the first amplifier stage 350, collector 363 being connected directly to the B+ conductor 242, emitter 361 being connected over bias resistor 364 to ground; and also in the manner of a conventional emitter-follower arrangement to the third amplifier stage 370. Capacitor 367 is connected between the B+ supply conductor 242 and ground.

The third amplifier stage 370 comprises a transistor member 370 having emitter, base and collector elements 371, 372, 373, respectively, the base 372 being coupled to the output circuit of the second amplifier stage 360, emitter element 371 being connected over RC network including resistor member 375 and capacitor member 376 to ground, and collector element 373 being connected over resistor 374 to the B+ conductor 242, and also over the feedback loop 347 and resistor 342 to the input circuit 340 for the first amplifier stage 350; and over coupling capacitor 376 and resistor network 378, 379 to the LC network 380 for the oscillator. The signal output of the third amplifier stage, which as now shown, comprises a variable frequency pulse train is also coupled over resistor 377 and output conductor 213 to the buffer and mixer stage 215 (FIG. 6).

The LC network 380 basically comprises a pair of fixed value capacitors 381, 382 and an inductance member 387 connected over resistor 378, 379 to the output of the third amplifier stage 370 and over resistance 389 to the feedback circuit for the first amplifier stage 350. Inductance 387 is center tapped and connected over resistor 388 to ground. It is apparent that changes in the LC value of network 380 will effect a corresponding change in the frequency of oscillation of the oscillator circuit 207, and a corresponding variation in the frequency of the pulses in each train which is coupled over output conductor 213.

Adjustment of the LC network to different values is effected by the coupling of signals over the first input circuit 390 which couples the output signals of the altitude sensor device 113 as received over conductor 211 and resistance 391 to the junction of a pair of oppositely poled "varicap" capacitors 383, 384 which are connected across capacitors 381, 382, whereby changes in the value of the direct current signal which represent the altitude of the aircraft effect a change in the value of the capacitance of the LC network 380, and a corresponding adjustment of the frequency of oscillation of the FM oscillator circuit 207.

In a similar manner, a second input circuit 392 couples the output signals of sawtooth generator 209 (controlled by the pitch sensor 109) received over conductor 212 and resistor 393 to the junction of a second pair of oppositely poled "varicap" capacitors 385, 386 which are also connected across the components of network 380 including inductance 387 and capacitors 381, 382 and 383, 384.

It will be recalled that the pitch representative signals comprise a sawtooth waveform which vary in amplitude with variation in the pitch of the aircraft, and which is synchronized to the horizon sync signal. Coupling of a sawtooth waveform to the capacitors 385, 386 of input circuit 392 during the period of a wavetrain will therefore result in a progressive change in the value of the capacitors, and a progressive change in the frequency of oscillation of the oscillator circuit 207. Thus, as a train or set of sine wavepulses is coupled over input circuit 340, and (assuming level flight) a maximum value negative going sawtooth wave is coupled over input circuit 292 to the FM oscillator 207, the oscillator will provide a train of outgoing pulses in which the peaks of the initial pulses are spaced from each other at a larger distance than the peaks of the subsequent pulses of the wave train.

With changes in pitch, as for example, maneuvering of the craft toward a "nose-down" or diving attitude, the amplitude of the pitch signal waveform coupled over input circuit 292 approaches zero, and the change of the capacitance value of capacitors 385, 386 will be of a comparatively small value, whereby the train of output pulses of oscillator circuit 207 will be more closely related to the train of sine wave impulses which are coupled to the input circuit 340. Thus, if the aircraft is in a true vertical dive, the slope will be zero and the oscillator will oscillate at the frequency of the input train, and the pulses of the output train will be equally spaced to provide a representation on the display device consisting of a plurality of symbols which are equally spaced from each other in each path.

Variations in altitude of the craft are represented by a corresponding change in the value of the D.C. bias signal which is coupled over resistance 391 to the junction point of capacitors 383, 384 in the LC network 380 to effect a corresponding variation in the capacitance value of the capacitors, and therefore the frequency of oscillation of the FM oscillator 207. It is apparent that with a decrease in the aircraft altitude and a reduction of the frequency output of the oscillator 207, the size of the symbols in each row is increased and the distance between the symbols is likewise increased.

In a similar manner as the altitude of the aircraft increases, the altitude representative signal effects a change of the capacitance of capacitors 383, 384 in the LC network 380 to increase the frequency of oscillation of the FM oscillator, and the successive waveforms generated in each train are more closely spaced so that the size of each of the sine waves in the train are correspondingly reduced to effect a corresponding reduction in the size of the symbols in each row on the display.

In brief summary of the circuits thus far described, the speed crystal oscillator 200 is operative to generate pulses at 31.26 kc., and the gate 205 is operative to phase stabilize the waveform from frame to frame (and thus create a stable pattern of elements on the display screen) by coupling short bursts (1 millisecond) of the speed crystal oscillator pulses over conductor 206 to the input circuit of the FM oscilaltor 207 at the time when the modulating waveform is such that the FM oscillator is oscillating at 31.26 kc. (just after flyback of the pitch modulating sawtooth wave), and the two become phase locked. By varying the frequency of the 31.26 kc. speed oscillator (variation of the ground speed control), the phase of the difference frequency is caused to rotate with respect to the vertical frame, and thereby provide smooth motion of the ground texture elements across the display, slow motion being provided during the highs (near the horizon), and more rapid motion being provided as the frequency decreases (near the bottom of the screen). Variable amplitude sawtooth signals provided by the pitch sensor effect a corresponding variation of the frequency of the pulses in each train, and variable value signals provided by the altitude sensor effect a corresponding variation in the size of the sine wave output and consequently the spacing therebetween.

Derivation of Odd and Even Rows

The train output of the FM modulator which may vary in each frame from 31.260 kc. to approximately 30 kc. is heterodyned with the signal output of a local oscillator in a buffer mixer stage 215 (FIGURE 6) to obtain an FM difference frequency with a high frequency of 1.5 kc. and a low frequency of 240 c.p.s. When the difference frequency of the mixing circuit 215 is a harmonic of the vertical repetition rate, the waveform will be in synchronism with the vertical scan rate. Any slight change introduced in the frequency of the FM oscillator 207 causes the difference frequency output of the buffer mixer stage to lose synchronism with the vertical trace thereby creating the illusion of motion. The rate of motion can therefore be controlled by adjustment of frequency of the speed crystal oscillator, and accordingly of the difference frequency output of the mixer 215.

More specifically, the local oscillator 217 which generates a 31.5 kc. signal for mixing in the mixer stage 215 may be similar in structure to the speed crystal oscillator 200, or any oscillator of conventional design, and since the speed crystal oscillator 200 has been described in detail above and such oscillators are well known in the art, the local oscillator 217 is shown in block form. The output pulses of the local oscillator 217 is used to beat against the output train of the FM oscillator 207 to provide a larger range of frequencies, the range of "difference" frequencies in the present arrangement obtained with such structure extending from 240 c.p.s. to 1.5 kc.

The mixer stage 215 for effecting the mixing action, and the provision of the difference frequency output basically comprises a first input terminal or circuit 400 over which the output signals of the FM oscillator 207 are received, a first transistor amplifier stage 410, a mixer stage 415, a second input circuit 420 for coupling the output pulses of local oscillator 217 to the mixer stage 415, a filter trap 430 for filtering the signal output of the mixer stage 415, and a third transistor stage 440 connected as an emitter-follower for coupling the difference frequency pulse trains over conductor 219 to an inverter circuit 222.

More specifically, input terminal 400 couples the "trains" of FM signals to the first amplifier stage 410 of the mixer circuit 215, which includes an NPN transistor member 410 having emitter, base, and collector elements 411, 412, 413, respectively, base element 412 being connected to the input terminal 400 and over base bias resistor 401 to ground; collector element 413 being connected directly to the B+ conductor 242, and emitter element 411 being connected over resistor 414 to ground, and also to the input circuit for the second stage 415.

The second or mixer stage 415 includes an NPN transistor 415 having emitter, base and collector elements 416, 417 and 418 respectively, base 417 being connected to the output circuits of the first amplifier stage to receive the amplified "trains" of FM signals, and emitter 411 being connected over bias resistor 421 in input circuit 420 to ground, and over resistor 422 and conductor 218 to the output of the local oscillator 217; and collector 418 being connected over resistor 422 to the B+ conductor 242 and also over filter trap 430, whereby the mixed signal output of the FM oscillator 207 and local oscillator 217 which is coupled to the base and emitter of transistor 415′ respectively are extended over the collector circuit of the transistor 415′ to the filter trap 430.

Filter trap 430 may be a conventional low pass filter including series connected capacitor 431, inductances 432, 433, and capacitors 435, and capacitor 434 which is connected between the junction of conductors 432, 433 and ground, and capacitor 436 which is connected between capacitor 435 and ground.

As the mixed frequency output of the mixer stage 415 is coupled to trap 430, the trap filters out the 31.5 kc. frequencies to ground, and couples the difference frequency train to the emitter follower stage 440.

The difference frequency output of the filter trap 430 is obtained at the connecting terminal of capacitors 435, 436 and is coupled over a voltage divider including resistors 437, 438 to transistor 440′ of the emitter follower stage 440.

Transmitter 440′ is connected in an emitter follower configuration to couple the output of the stage to the inverter amplifier 222 and comprises an NPN transistor having emitter, base and collector elements 441, 442 and 443 respectively, the base 442 being connected over the voltage divider 437, 438 to the output of the filter trap 430; collector 443 being connected directly to the B+ conductor 242, and emitter 441 being connected over resistor 444 to ground, a tap on resistor 444 being provided to couple the difference frequency signals which are extended over the emitter follower stage 440 to the output conductor 219 and the inverter amplifier circuit 222.

Amplifier Inverter Circuit

The output of the motion perspective mixer circuit 215 which comprises a frequency modulated train of a difference frequency is now coupled to an amplifier inverter 222 (FIG. 6) for the purpose of obtaining two trains of impulses, one of which is an amplified replica of the input train and the other of which is 180 degrees out of phase with the amplified train. As shown in FIGURE 3E, the two different trains of impulses are fed over the two different channels to effect positioning of the symbols in adjacent rows of the display at correspondingly different vertical ends.

That is, with reference to FIGURE 2, it will be seen that the one train of impulses output from speed oscillator 144′ is coupled over conductor 223 to the clipper circuit 137′ which is associated with ground texture generators 1, 3, 5 (Channel 2) which produce the odd numbered paths on the display, and the alternate wave train is coupled over conductor 224 to clipper 137 which is associated with the ground texture generators 2, 4, 6 (Channel 1) and which produce the even numbered rows on the display. With reference to FIG. 3E it will be apparent that the symbols in the odd number of rows as generated by the one train, are vertically or "phase" displaced relative to the symbols in the even numbered rows.

With reference to FIGURE 6, the amplifier inverter stage 222 for providing the two phase displaced trains and thereby effecting the relative phase displacement of the symbols in the alternate rows on the display basically comprises an input circuit 450, a first transistor amplifier stage 455, an amplifier and signal derivation stage 460, amplifier inverter stage 470 and 480, and output circuits 465 and 485.

More specifically, the input circuit 450 includes a coupling capacitor 451 and a voltage divider circuit including resistors 452, 453 for coupling the difference frequency output train of the mixer stage 215 to the first amplifier stage 455 of the inverter amplifier 222.

The first amplifier stage 455 basically comprises an NPN transistor member 455′ having emitter, base and collector elements 456, 457, 458, respectively, the emitter element 456 being connected over resistor 459 to ground; the base element 457 being connected to the input circuit 450, and the collector 458 being connected over resistor 459′ to the B+ conductor 242 and also over conductor 464 to the signal derivation stage 460.

Signal derivation stage 460 basically comprises a transistor member 460' having emitter, base and collector elements 461, 462, 463 respectively, base element 462 being connected over conductor 464 to the output of the first amplifier stage 455, collector 463 being connected directly to the B+ conductor 242, and emitter 461 being connected over an RC network including adjustable resistor member 466 and capacitor 467 to ground, and also over an output circuit 465 to conductor 223 to provide an amplified replica of each pulse train to clipper 137' which is associated with Channel 2 (the odd rows of the display).

The output signal train which appears in the emitter circuit of the signal derivation stage 460 is also coupled over the adjustable resistance arm 466 and coupling capacitor 467' and voltage divider including resistors 468 and 469 to the inverter stage 470.

The inverter stage 470 basically comprises an NPN transistor 470' having emitter, base and collector elements 471, 472, 473, respectively, the emitter 471 being connected over bias resistance 475 to ground, the base 472 being connected over the coupling capacitor 467' to the output of the signal derivation stage 460, and the collector 473 being connected over resistance 474 to the B+ conductor 242, and also to the input circuit for emitter follower stage 480.

The emitter follower stage 480 basically comprises an NPN transistor 480' having emitter, base and collector elements 481, 482, 483 respectively, base 482 being connected to the output circuit of the inverter stage 470, collector 483 being connected directly to the B+ conductor 242, and emitter 481 being connected over resistance 484 to ground, and also over output terminal 485 to conductor 224 for the purpose of coupling a waveform train thereover to clipper 137 for Channel 1 which is 180 degrees out of phase with the wave train which is coupled over conductor 223 to clipper 137' for Channel 2.

Amplifier inverter 222 is thus operative responsive to the coupling of the successive trains of FM pulses of variable frequency to the input circuit 450 thereof to amplify such signals, and to provide a replica thereof over conductor 223 to the clipper 137' for Channel 2 to control the position of the symbols in the odd numbered rows, and a waveform which is 180 degrees out of phase with the first waveform to the clipper 137 for Channel 1 which controls the location of the symbols in the even-numbered rows. With reference to the previous application, and particularly to the clipping circuit 137 shown in FIGURE 16, it will be apparent that the signal train for a channel is coupled from the inverter to conductor 144' in the clipper circuit for such channel.

In summary, in the provision of motion perspective, a local oscillator 217 provides a train of output pulses at 31.5 kc. which is heterodyned in a mixer circuit 215 with the output of a frequency modulated oscillator circuit 207, whose frequency may change during each frame from 31.260 kc. to approximately 30 kc., the train output of the FM oscillator circuit being controlled by signals representative of the speed, pitch and altitude of the aircraft. When the resultant output of the mixer circuit 215 is applied to a low-pass filter, the output is a difference frequency comprising a train of waves whose frequency varies from 240 c.p.s. at the bottom of the picture (with the horizon at the top of the screen) to about 1500 c.p.s. at the top of the screen.

In order to phase stabilize the waveform from frame to frame, and thus create a stable pattern of elements on the screen, a short burst (one millisecond) of pulses at 31.26 kc. from a speed crystal oscillator 200 is gated into the FM oscillator circuit 207 at the time when the modulating waveform is such that the FM oscillator is oscillating at 31.26 kc. (just after flyback of the modulated wave), and the two become phase locked. By varying the frequency of the 31.26 kc. speed oscillator 217 (variation of the ground speed control), the phase of the difference frequency is caused to rotate with respect to the vertical frame, to thereby produce a smooth motion of the ground texture elements, a slow motion during the highs (near the horizon) and a more rapid motion as the frequency decreases (near the bottom of the screen).

The outputs of the mixer circuit 215 is coupled to inverter 222 which provides a first and second train of pulses which are 180 degrees out of phase, and couples the same to Channel 1 and Channel 2 respectively, and it is apparent that the symbols in the even and odd rows which are generated by the equipment in Channels 1 and 2 respectively, will be vertically displaced relative to each other as shown in FIGURE 3E.

*Random Texture Circuits 150*

As indicated in the earlier description, the purpose of the random texture circuits 150 is to develop a quasi-random effect in the ground texture pattern to assist in the minimization of possible mental fatigue which may result from prolonged observation of the symbols from the horizon in the direction of the lower marginal edge of the display. To accomplish such effect, several separate operations are performed on the texture elements in the different rows. One operation consists of blanking out a ground texture element, a further operation consists of shifting an element laterally as it progresses down the display screen, and a still further operation comprises varying of the size of an element.

In accomplishing such end, a speed countdown circuit 228, 229 (FIG. 2) is operative to generate a chain of tracking pulses for each channel which will lock in and track with the FM waveform for such channel as it changes from field to field, each of the tracking pulses locking in with a different one of the FM pulses and having a width that is variable as the ground texture elements generated by such FM pulse moves down the display screen in order to completely "cover" the element as it expands.

Figure 7B:
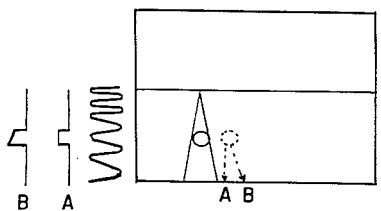
FIGURES 7B and 7C are illustrations of the waveforms generated by such circuits.

With reference to FIGURE 7B, the manner in which the tracking pulses are operative will be readily apparent. As there shown, a square wave tracking pulse, as generated, locks to a corresponding one of the sine waves in the FM train for the channel, the particular one of the train sine waves being selected at random by the equipment. As shown hereinafter, the tracking pulse will advance across the display with its "locked" pulse in the train. Assuming the positive square wave tracking pulse of FIGURE 7B has locked to the fourth pulse of the FM train there shown, such pulse as coupled by the speed count down equipment 228 over shift register S1 to ground texture circuit 2 will effect displacement of the symbol or cue which would normally appear in the position shown in solid lines to the position shown in dotted lines. As the square wave tracking pulse is locked to the FM sine wave pulse, the symbol will follow the path illustrated by dotted line A. However, if the tracking pulse is modified to provide a pulse having vertical leading and trailing edges and a falling slope (as described more fully hereinafter), the symbol will follow the path identified by the dotted lines B in FIGURE 7B.

Figure 7C:
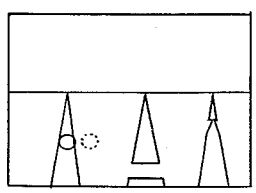

The illustration of FIGURE 7C illustrates how the output signals of shift circuits S2 and S3 may be operative to lock to different ones of the sine wave pulses in the FM train for Channel 2 (rows 2, 4, 6) to effect correspondingly different modification of the symbol outputs. As there shown, the pulse output of shift register S2 which couples control signals to the second ground texture generator circuit 4 (Channel 2) selects an earlier pulse in the FM train and effects blanking of the symbol which would normally be provided by such pulse, and as in the case of shift register 1, the "blanking" tracking pulse output of shift circuit S2 is locked to such pulse, and advances therewith across the display to prevent the generation thereof.

The pulse output of shift circuit S3, as illustrated, has locked to a later sine wave pulse in the sequence of the FM train and couples a control signal to the ground texture circuit 6 during the time period of generation of the pulse which results therefrom to effect a reduction in size of the pulse. As in the previous instance, the tracking pulse is locked to the FM sine wave pulse selected thereby, and advances across the display therewith.

*Countdown Circuitry for Channel 1*

As indicated in the block diagram of FIGURE 2, a first countdown circuit arrangement 228 is provided for Channel 1, and a second countdown circuit arrangement 229 is provided for Channel 2, each of which controls a series of three shift circuits S1, S2, S3 and B1, B2, B3 respectively, to effect the application of randomizing signals to the ground texture circuits 2, 4, 6, and 1, 3, 5, respectively, to effect the consequent variation of the positioning, size or shape of certain of the symbols which are generated thereby. In that each of the countdown and shift circuits are operative in a similar manner, the description is limited to the teaching of the manner in which one set of circuits, such as the countdown circuit 228 is operative to effect control of the position of a symbol which are generated by the ground texture circuit 2 for Channel 1.

As shown in FIGURE 2, the output pulse train of speed oscillator 144' which is coupled to clipper 137 for Channel 1 is also coupled over conductor 226 to the speed countdown channel 228, and accordingly the input to countdown circuit 228 will comprise a train of FM pulses which is representative of the speed, pitch and altitude of the aircraft.

As shown in FIGURE 7A, the speed countdown equipment 228 for Channel 1 basically comprises an input circuit 500 for coupling the FM train of pulses which are received over conductor 226 from speed oscillator circuit 144' to a master blocking oscillator circuit 550. The input circuit 500 may comprise a conventional shaper amplifier circuit, if desired, for providing a train of square wave output pulses which correspond to the FM input pulses which are coupled thereto, although the master blocking oscillator circuit 550 may be operated directly by the FM train, if desired. Various forms of shaper amplifiers may be used, it being appreciated that a simple and expedient arrangement for converting sine wave input signals to square wave signals comprises operating an amplifier circuit in the saturation region, whereby the output signals will consist of square-wave signals. Obviously, more refined and complex circuits may be used for signal shaping, if desired.

The square-wave output of the input circuit 500 is coupled over a differentiating stage 523 to provide differentiated pulses as shown by the wave form adjacent the input circuit of master oscillator 550 to trigger the same as a driving blocking oscillator.

The master blocking oscillator may be a transistorized version of a conventional blocking oscillator such as the type shown in "Wave Forms," Radiation Laboratory Series 19, page 222, FIGURES 6–13, in which the trigger pulses are coupled to the plate (or collector), and the output pulses are derived across the transformer in the plate (or collector) circuit, and coupled to a clipper circuit 560 which are coupled across the oscillator output circuit.

In operation, the blocking oscillator is triggered by the leading edge of each of the differentiated pulses which are coupled thereto to provide a sharp synchronizing pulse over the output circuit thereof, the clipper circuit 560 being used to eliminate the negative portions of the output pulses of the blocking oscillator 550. In addition to providing a sharp synchronizing pulse, the blocking oscillator effects the provision of pulses which are of a constant amplitude, it being recalled that the pulses of the motion perspective sine wave which is coupled to the shaping amplifier are of various frequencies, and accordingly of limited use in effecting repeated reliable triggering operations for the subsequent stages.

In that the blocking oscillator 550 provides a sharp pulse of constant amplitude for each differentiated pulse which is coupled thereto, and the time of occurrence between the differentiated pulse is in turn determined by the spacing between the sine wave peaks in the motion perspective train of signals, the output pulses of the blocking oscillator 550 will be synchronized with the motion perspective sine wave pulses and will be spaced in a related manner.

The output sync pulses of the master blocking oscillator 550 and clipper circuit 560 as shown in FIGURE 7A are coupled to the countdown circuits CD1, CD2, CD3 for shift circuits S1, S2, and S3, respectively. With reference to countdown circuit CD1 it will be apparent that the sync pulses are coupled over two paths X and Y respectively, the X path extending over a gate circuit 565 and a countdown oscillator circuit 570 to the X terminal on a flip-flop circuit 620, and the Y path extending directly to the Y terminal of the flip-flop circuit 620.

As shown in detail hereinafter, the sync pulses of the master blocking oscillator 550 are gated to the countdown oscillator 570 which counts a number of the pulses (determined by the setting of the oscillator) and as the count is reached the countdown circuit transmits a countdown command pulse over the X path to the Y terminal of the flip-flop circuit 620 to trigger same to generate the leading edge of a square wave for coupling to shift circuit S1. Since the sync pulse is synchronized with the leading edge of a sine wave of the FM train, the countdown command pulse which triggers the flip-flop circuit 620 and the leading edge of the square wave output of the flip-flop circuit 620 are also synchronized to the leading edge of the sine wave pulse on the FM train.

The flip-flop circuit 620 remains in such position (and the generation of the square wave pulse continues) until such time as the next sync pulse of the master blocking oscillator 550 is coupled over path Y to the Y terminal of the flip-flop circuit 620 to trigger the flip-flop circuit back to its original state, and thereby terminate generation of the square wave pulse which is coupled to the shift circuit S1. Since the pulse next coupled over the Y path is synchronized to the leading edge of the next sine wave pulse in the FM train, it will be apparent that the square pulse generated will have a duration which is related to the duration of the sine wave in the FM pulse to which it has locked, and further that the duration is sufficient to "cover" or "envelop" the sine wave pulse. The relation of the square wave pulse to its associated sine wave pulse is clearly shown by the waveforms A, B which are shown adjacent the edge of the display in FIGURE 7B.

The output of the flip-flop circuit 620 is coupled over a shift circuit S1 which basically comprises a gating and mixer circuit for mixing the square wave output with a horizon sawtooth waveform to provide a modified pulse having a waveshape such as shown in FIGURE 7A adjacent the output circuit of shift circuit S1. The modified pulse is now coupled to the ground texture circuit 2 for the purpose of effecting the lateral shift of the symbol which is created by the sine wave pulse which is introduced therewith.

With reference to FIGURE 7B it will be apparent that if a square wave pulse is locked to the pulse, the symbol would advance across the screen along the path indicated by the dotted line A. The shift circuit S1 is therefore operative to mix the sawtooth signal with the square wave to provide the modified signal B shown in FIGURE 7B and the resultant movement of the symbol along path B in FIGURE 7B.

The foregoing description represents the action originating from the teaching of only one FM pulse, and additional circuitry CD2 and CD3, S2, S3 are provided to establish a train of tracking pulses and the "randomizing" of the position of other pulses output by the second, fourth and sixth ground texture circuits. Such circuits are similar in structure to the circuit arrangement CD1. However in the interest of preventing more than one countdown arrangement from locking to the same FM pulse, the time pulse upon which the first relaxation oscillator synchronizes is blanked by the action of gate circuit G2, G3 before the pulses are sent to the oscillator for the subsequent countdown circuits.

Count Down Circuit CD1

The specific manner in which the countdown circuitry CD1 is operative to select a pulse of the FM train and to track such pulse is now set forth.

As shown in FIGURE 8, the output pulses of the master blocking oscillator 570 are coupled over conductor 563 and an X path to a gate 565 which couples the synchronized pulse train to the countdown oscillator 570. Gate 565, as there shown, comprises a diode 566 for coupling the peak portions of the synchronizing pulses over a voltage divider including resistances 567, 568, which are connected between B+ conductor 242 and ground, and over coupling capacitor 569 to the input circuit for the countdown oscillator 570.

Count Down Oscillator 570

As noted above, the pulses of the master blocking oscillator are transmitted over gate circuit 565 to the countdown oscillator circuit 570 at a multiple of the vertical rate of the raster, and the countdown oscillator which runs at the vertical rate automatically locks one of the pulses input thereto to one of the pulses in the FM sine wave train for the ground texture circuit. In the disclosed arrangement the countdown oscillator 570 is operative to select a particular one of the pulses of the train coupled thereto by gate 565 which happens to occur 20 milliseconds after the start of the countdown, and the countdown oscillator 570 continues to count off 20 milliseconds at a cyclic rate. Since the countdown oscillator 570 is free-running and is synchronized only to the master blocking oscillator pulses which are synced to an FM train, the oscillator 570 may choose any one of the impulses of the FM train as the particular one of the pulses to which it will lock.

With reference to FIGURE 8, the master blocking oscillator pulses which are synced to the FM train are coupled over conductor 564 (Y path) to the Y terminal of the flip-flop circuit 620 and over gate circuit 565 to a first amplifier stage 575 in countdown oscillator 570 for amplifying the sync pulses, a pulse count circuit 585 for counting the receipt of a predetermined number of pulses in the incoming train, and providing an output command pulse each time the countdown occurs, and a two-stage amplifier circuit 600 for coupling an amplified version of the countdown command pulse provided by the pulse count circuit 585 over conductor 615 to the X input terminal of flip-flop or multivibrator circuit 620.

More specifically, the amplifier stage 575 basically comprises an NPN transistor member 575' having emitter, base and collector elements 576, 577, 578 respectively, emitter 576 being connected directly to ground, base 577 being connected over bias resistor 579 to ground, and also to the input conductor 573 which couples the sync train output of gate circuit 565 thereto, and collector 578 being connected over 580 to B+ conductor 571, and also over a D.C. coupling circuit including resistor 581 and coupling capacitor 582 to the input circuit for transistor 585 in the pulse count circuit 585.

The pulse count circuit 585 basically comprises a double base diode transistor 585' including emitter element 587', base element #1 586 and base element #2 588. Base element 586 is connected directly to ground, base element 588 is connected over resistor 589 to the B++ conductor 572 and over capacitor 590 to ground, and also to the output circuit of the first amplifier stage 575 which is operative to couple the sync pulses thereto. Emitter 587 is coupled to a charging circuit including capacitor 591 and over resistors 592 and 593 to B++ conductor 572 to provide an RC time constant for the charging circuit which is related to the vertical rate of the raster. The signal output of the charging circuit is coupled over a coupling capacitor 594 and a voltage divider including resistor members 595, 596 which are connected between B+ and ground to the input circuit for a two-stage amplifier circuit 600. Amplifier circuit 600 may comprise a conventional two-stage amplifier including a first NPN transistor 600' having emitter, base and collector elements 601, 602, and 603, respectively, emitter 601 being connected over resistor 604 to ground, base 602 being connected to the output circuit of the pulse count circuit 570 to receive the countdown command pulse therefrom, and collector 603 being connected over resistor 605 to B+ conductor 571, and also to the transistor 610 of the second stage of the amplifier 600.

The second amplifier stage of two-stage amplifier 600 basically comprises an NPN transistor 610 including emitter, base, and collector elements 611, 612, 613 respectively, base 612 being connected to the output of the first amplifier stage to receive the amplified countdown command pulse therefrom, collector 613 being connected directly to B+ conductor 571, and emitter 611 being connected over resistor 614 to ground, and also over conductor 615 to the X input circuit for the multivibrator 620.

In operation, as each pulse of the train of sharp, constant-amplitude pulses of the FM train are coupled by the master blocking oscillator 550 over the gate circuit 565 to the first amplifier stage 575, the pulses are amplified by transistor 575' and further transmitted over RC coupling network 581, 582 to the second base 588 of the double base diode 585'. Capacitor 591 is charged in the direction of the B++ voltage on conductor 572 over a circuit which extends from B++ over conductor 572, resistor 589, the first section of transistor 585 and capacitor 591 to ground. The charging of capacitor 591 continues as each incoming pulse of the train is coupled to the first section of transistor 585 until the voltage on the capacitor 591 and the incoming pulses is of a value to bias the first base section to conduct and discharge the capacitor 591 thereover to ground. Resistor 593 and adjustable resistor 592 are selected and set respectively to provide an RC constant for the capacitor charge circuit which is mated to the vertical rate of the raster.

The pulse resulting from the discharge of capacitor 591 as the count is reached is coupled over capacitor 594, amplified by transistor 600', and coupled over the emitter-follower stage 610, and conductor 615 to the input circuit X for the flip-flop or multivibrator stage 620.

In that the sync pulses which are coupled to the pulse count stage 585 are of a constant amplitude, it is apparent that if the circuit values are adjusted to have the countdown occur at the vertical rate of the radar trace, even though the time of occurrence of the same sync pulse in successive trains varies relative to vertical repetition rate, the countdown command pulse will be provided only with the occurrence of the particular sync pulse in each succeeding cycle which resulted in the command pulse in the preceding cycle, and as a result the countdown circuit 570 will always provide the command pulse at the time of occurrence of the same pulse in the FM train (i.e., locked to such pulse) even though the pulse may be advancing in position across the display screen as the result of a differential frequency relative to the vertical trace for the purpose of illustrating motion.

Multivibrator Circuit 620

The multivibrator 620 basically comprises a first input circuit X and a second input circuit Y, a first control or switching transistor 630, a second control or switching transistor 640, an output transistor 650 and a second output transistor 655 for coupling square wave tracking pulses to the shift circuit S1 to effect a lateral displacement of the symbols which are established by the corresponding pulse in the FM train.

The input circuit for terminal X basically comprises a series-connected resistor 616 and capacitor 617 which are connected to the junction point of a diode 622 and resistor 623 to couple the countdown command pulses to a control circuit which effects operation of the display stage from one stable condition to a second stable condition. The second input circuit Y basically comprises a series connected resistor 618 and capacitor 619 connected to the junction point of a series connected resistor 625 and diode 626 to couple each pulse of the sync pulses which are generated by the master blocking oscillator 550 to a further control stage which normally maintains the circuit in the first condition and effects operation of the multivibrator or flip-flop circuit 620 from the second stable condition back to the first stable condition.

The first control transistor 630 basically comprises emitter, base and collector elements 631, 632, 633, respectively, and the second control transistor 640 basically comprises emitter, base and collector elements 641, 642, 643, respectively. The emitter element 631 of the first control transistor 630 is connected over resistance 634 to ground and directly over conductor 635 to emitter 641 of the second control transistor 640. Base 632 of the first control transistor 630 is connected over bias resistance 623 to ground, and also to resistor-diode combination 621, 622 connected to input terminal X, and also over an RC network including resistor 636 and capacitor 637 to the collector 643 for the second transistor 640. Collector 633 is connected over load resistor 638 to the B+ conductor 571 and also to the output transistor 650.

Emitter 641 of the second control transistor 640 is connected over capacitor 644 to ground, base 642 of transistor 640 is connected over bias resistor 624 to ground, over resistor-diode combination 625, 626 to the input terminal Y and also over RC network including resistor 645 and capacitor 646 to collector 633 of control transistor 630; and collector 643 is connected over load resistor 647 to the B+ conductor 571 and also to control transistor 655.

Transistor members 650 and 655 are connected in a conventional emitter-follower configuration for the purpose of coupling the output pulses which appear in the collector circuits of control transistor 630 and 640 respectively, over output circuits 660 and 661 respectively. Transistor 650 basically comprises an emitter 651, a base 652, and a collector 653; emitter 651 being connected over resistor 654 to negative battery, and also to output conductor 660, base 652 being connected to the output circuit of control transistor 630 and collector 653 being connected to B+ conductor 571.

Coupling transistor 655 basically comprises emitter, base and collector elements 656, 657, 658, respectively, emitter element 656 being connected over resistor 659 to negative battery, and also over output circuit 661; base 657 being connected to the output of the second control transistor 640, and collector 658 being connected to the B+ conductor 571.

In operation, the same output pulses of the master blocking oscillator 550 are coupled over gate 565 to the amplifier 575 and the pulse count circuit 570, and as a sufficient number of pulses are coupled to the countdown circuit capacitor 591 changes to a value sufficient to effect breakdown of the second section of the double base diode 585', which conducts, and discharges capacitor 591 to effect the coupling of a command pulse over the amplifier stage 600 and conductor 615, resistor 616 and capacitor 617 to input terminal X for multivibrator 620.

The same output pulses which are generated by master blocking oscillator 550 and coupled over the Y path including resistor 618 and capacitor 619 to the Y input terminal for the multivibrator 620 will be coupled over the input circuit including resistor 625 and diode 626 to the base 642 of transistor 640 to bias same to conduct, and the reduced potential output at the collector 643 of transistor 640 is coupled over the RC circuit 636, 637 to the base 632 of the first control transistor 630 to maintain same in the nonconductive state. The reduced potential output which occurs in the collector 643 of the transistor 640 also appears at the base of the output transistor 655 to drive the same to cut-off, and the potential at the emitter 656 of transistor 655 will be at its most negative value, as shown in the initial portions of the waveform appearing adjacent the output circuit 661.

In that the double base diode 585 is conductive only during the period of recipt of a sync pulse from the master blocking oscillator, and the RC constant of the charging circuit is set to the vertical rate of the raster, it is apparent that even though the same sine wave pulse occurs at a later period in the subsequent trace, the double base diode will not conduct until the sync pulse for such sine wave pulse is received, and accordingly the command pulse of the pulse count oscillator 575 is truly locked to the particular one of the successive pulses in the FM train which was selected at random in the initial cycle.

As the command pulse is coupled to the X terminal for the multivibrator 620, the first control transistor 630 is rendered conductive, and the drop in potential in the collector circuit thereof is coupled over the RC circuit 645, 646 to the base 642 of the second control transistor 640 to bias same to cutoff, and a rising potential appears at the collector 643 which is coupled over RC network 636, 637 to the base 632 of the first control transistor 630 to effect further conductivity thereof. The rising potential in the collector circuit 643 is also coupled to the base 657 of the output transistor 655 to effect the conductivity thereof, and a corresponding rise in the potential which appears in the output circuit 661 which is connected to emitter 656, to provide the leading edge of the square wave output pulse as shown in FIGURE 8.

The multivibrator 620 being bistable, remains in such condition until such time as the next pulse is coupled over the Y circuit to render the second control transistor 640 conductive, and (in accordance with conventional multivibrator operation) the first control transistor 630 nonconductive at such time. As as result of such operation an increasing potential in the collector circuit 643 of transistor 640 also biasses the output transistor 655 nonconductive, and an increasing negative potential occurs in the output circuit 661 to provide the trailing edge of the square wave pulse as illustrated by the waveform which is shown adjacent thereto in FIGURE 8.

Summarily, with each occurence of the particular one of the pulses in the train to which the countdown circuit locks, a command pulse is coupled to the input circuit X to initiate the generation of a positive square wave signal in output circuit 661, and as the sine wave in the FM train subsequent to the selected pulse occurs, the corresponding sync pulse output from the master blocking oscillator 550 is coupled to the Y terminal of the multivibrator 620 to terminate the generation of the square wave pulse. Thus, the square wave pulses generated by the multivibrator 620 will completely "cover" or "blank" the duration of the particular pulse which has been selected.

It is apparent that the output transistor 650 which is connected in the collector circuit of the first control transistor 630 will provide a square wave output pulse over output circuit 660 which is of similar duration to the pulse which appears in circuit 661, but which is of an opposite polarity.

As shown in FIGURE 2, the square wave output pulse is coupled over shift circuit S1 to the ground texture circuit 2 to control same to delay the generation of the symbol which would have been generated by the corresponding sine wave pulse.

As shown in FIGURE 8, shift circuit S1 basically comprises an input circuit 671 connected to a source of horizon sawtooth signals, an NPN transistor 675 connected as an emitter-follower, a gate or mixing circuit 680 connected to the coupling stage and also to the output of multivibrator 620, and output conductor 684.

The input circuit 671 includes a coupling capacitor 672 for coupling the incoming negative horizon sawtooth signals over a voltage divider comprising resistors 673, 674 to the coupling stage 675.

Coupling stage 675 comprises an NPN transistor 675' having emitter, base and collector elements 676, 677, 678, respectively, base 676 being connected over the input circuit 671 to the source of negative sawtooth signals, collector 678 being connected to B+ conductor, and emitter 676 being connected over resistor 679 to negative battery, and also to the gate or mixing circuit 680.

Gate 680 includes a first diode connected to the emitter-follower circuit of transistor 675; and a second diode connected to the output terminal 661 of the multivibrator 620, the junction of the diodes 681, 682 being connected over resistor 685 to B+ conductor 571 and over capacitor 683 to the output conductor 684 to the ground texture circuit 2.

In operation, the diode 681 is driven conductive by the vertical leading edge of the sawtooth waveform, and the reduced potential which thereupon occurs at the junction point of gate 680 and the anode of diode 682 effects biassing of diode 682 to cutoff. As the following portion of the negative sawtooth signal (generated at the vertical repetition rate) is coupled over the input circuit 671 to the base 677 of transistor 675, the transistor 675 is biassed to effect reduced conductivity, and the potential in the emitter circuit of diode 681 becomes more and more negative to bias the diode 681 in gate 680 to increased conductivity.

As the diode 682 is driven conductive by the leading edge of the negative square wave pulse which is coupled to the cathode of diode 682, the potential at the gate junction drops sharply, and the leading edge of the pulse is reproduced at the gate junction point for mixing with the negative sawtooth waveform output of transistor 675', and a falling potential occurs at the junction point during the application of the square wave pulse to the diode 682 by flip-flop circuit 620. As the trailing edge of the square wave pulse is coupled to the cathode of diode 682, the conductivity of diode 682 is once more cut off.

The resultant output waveform as shown adjacent conductor 684 is coupled to the ground texture circuit 2. With reference to the above identified application, and particularly to FIGURE 14 thereof, the shift pulse is coupled over conductor 220a to the pulse delay circuit 101 in the ground texture circuit 2.

As shown in FIGURE 7B, the symbol to which the "tracking" pulse output of shift circuit S1 is locked, is shifted laterally to effect displacement of the symbols on the display, and is maintained in such displaced relation with movement thereof across the display.

The pulse signals for effecting a change in size of the symbols or effecting complete blanking thereof are coupled to the junction of resistor 254, capacitor 258 and diode 260 in the triangle generator circuit 105 (FIGURE 14 of the previous disclosure). Manifestly if the negative signal received from the shift circuit is of a relatively small value, the diode conduction is reduced by a corresponding amount to reduce the size of the symbol by a corresponding amount. With the coupling of a negative signal of a value sufficient to bias the diode 260 to cutoff, the symbol will, of course, be blanked. The resultant effects are indicated schematically in FIGURE 7C, wherein the symbol subsequent to the laterally displaced symbol has been "blanked" and the preceding symbol has been reduced in size.

The manner in which the shift circuits S1, S2, S3 effect the coupling of lateral displacement signals, blanking signals, and size reducing signals to the display to modify the different symbols which are provided by the pulses in the FM sine wave trains will be apparent from the foregoing disclosure.

*Ground Texture Symbol Shading*

As shown in FIGURE 1 of the drawing the symbols are shaded to provide an indicator of the aircraft azimuth to the pilot. In effecting such display, the ground texture output pulses are coupled to a ground texture shading circuit 141 which includes a phasing network for differentiating the ground texture pulses.

More specifically the positive video pulses are differentiated by a first RC circuit and coupled to the 90 degree tap of a 360 degree azimuth potentiometer, and the negative video pulses are differentiated by a second RC circuit and coupled to the 270 degree tap of the azimuth potentiometer. Positive ground texture video, which has not been differentiated is coupled to the zero degree tap, and negative video which has not been differentiated is coupled to the 180 degree tap.

The negative ground texture video will generate black texture on the display and the positive video will generate white texture on the display. A differentiation of either signal will produce elements that are half white and half black, the black preceding the white in the one instance, and the shading being reversed in the other instance.

Thus as the aircraft changes heading, the wiper arm on the azimuth potentiometer is rotated over the potentiometer winding by a similar angular increment to select correspondingly different ground texture video information for coupling to the video amplifier circuit 145.

*Conclusion*

The novel system of the foregoing disclosure is operative to mix information derived from a plurality of sensor sources, and to effect video mixing of the signals for presentation as an integrated picture on a display, whereby the necessity for "sampling" a large number of separate individual displays by the observer and randomly integrating such information is obviated. The novel system is further operative to provide a ground pattern in which the symbols move across the display with "motion perspective," the symbols closer to the horizon being spaced more closely with each other and moving more slowly at a slower rate than the symbols which occur nearer to the bottom marginal edge of the display. As a result, the display provided by the system more closely resembles true world conditions.

The display is further new and novel by reason of the random texture nature of the ground pattern symbols which permits viewing of the display for increased periods of time without resultant eye fatigue, and makes practical the use of the arrangement in an increased number of applications.

While what is described is regarded to be a preferred embodiment of the invention, it will be apparent that variations, rearrangements, modifications and changes may be made therein without departing from the scope of the present invention as defined by the appended claims.

What is claimed is:

1. In a visual indicator system for displaying different items of information on a display unit relating to the relative movement of an object, generator means for providing the display of a plurality of rows of symbols on said display unit, each row comprising a plurality of symbols disposed in aligned, spaced relation, and random texture circuit means including means for generating a shift signal, and means in said generator means responsive to said shift signal to displace at least one symbol on said display laterally relative to the other symbols in its row.

2. In a visual indicator system for displaying different items of information on a display unit concerning the relative movement of an object, a generator circuit for providing a plurality of rows of symbols on said display unit, each row comprising a plurality of symbols disposed in aligned, spaced relation which move from a first point on the display to a second point on the display in spaced relation, and random texture circuit means including signal generator means for generating a shift signal set, means in said generator circuit responsive to said shift signal set to adjust at least one symbol in at least one of said rows laterally on said display relative to the other symbols in its row, and means in said signal generator means for maintaining the shifted symbol in displaced relation to the other symbols in its row during movement of the symbols across the display.

3. In a visual indicator system for displaying different items of information on a display unit concerning the relative movement of a object, a generator circuit for providing a plurality of rows of symbols on said display unit, each row comprising a plurality of symbols disposed in aligned, spaced relation, each symbol for a given set of display information being characterized by a predetermined size and a predetermined position in the row relative to the other symbols in its row, and random texture circuit means for selectively effecting modification of at least one of said charcteristics of at least one symbol on the display without effecting modification of the characteristics of other symbols on the dislay.

4. In a visual indicator system for displaying different items of information on a display unit concerning the relative movement of an object, a generator circuit for providing the display of a plurality of rows of moving symbols on said display unit, each row comprising a plurality of symbols disposed in aligned spaced relation with the other symbols in the row, each symbol being characterized at given positions on the display by a predetermined size and a predetermined position relative to the other symbols in its row, the improvement comprising random texture circuit means including signal generator means for generating a shift signal set, means in said generator circuit responsive to said signal set for effecting a corresponding modification of at least one of said characteristics of at least one of said symbols on the display independent of modification of the same characteristic of other symbols in its row, and means in said signal generator for providing said shift signal for said symbol during movement of the symbol across the display.

5. In a visual indicator system for displaying different items of information on a display unit relating to the relative movement of an object, a generator circuit for providing a display of a plurality of symbols in a row which extend across at least a portion of the display, including means for effecting relative movement of the symbols across the display to provide an indication of relative movement of the object, and random texture circuit means including signal generator means for providing shift signals, and means in said generator circuit responsive to said shift signals to adjust the position of at least one selected symbol laterally relative to other symbols in the row, and means in said signal generator means for maintaining said lateral adjustment of the symbol continually during its movement across the display.

6. In a visual indicator system for displaying different items of information on a display unit relating to the relative movement of an object, a generator circuit means including a first circuit means for providing a plurality of symbols in a row which extend across at least a portion of the display, and random texture circuits including shift circuit means for providing shift signals, means in said generator circuit means responsive to said signals to adjust the position of at least one selected symbol laterally relative to other symbols in the row, and means in said shift circuit means for varying the distance of lateral adjustment of said selected symbol to different values.

7. In a visual indicator system for displaying different items of information on a display unit concerning the relative movement of an object, a generator circuit including a first and a second signal channel, a first circuit means in said first channel for providing a first plurality of rows of symbols on the display, a second circuit means in said second channel for providing a second plurality of rows of symbols on said display set, and random texture circuits including a first signal generator means for providing a shift signal set, and means in said generator circuit responsive to said shift signal set to laterally adjust at least one symbol provided by one of said channels from its row.

8. A generator system as set forth in claim 7 in which said random texture circuits include a second signal generator circuit for providing a second set of shift signals, means in said generator circuit means responsive to said second shift signal set to laterally adjust at least one symbol in at least one of the rows provided by said other circuit means, the symbol which is laterally adjusted in the one row being different than the symbol which is shifted in said other row.

9. An arrangement as set forth in claim 7 in which said signal generator means includes means for generating a size adjusting signal set, and said generator circuit means includes means responsive to said size adjusting signal set to change the size of at least one symbol in one of the rows.

10. In a visual indicator system for displaying different items of information on a display unit relating to the relative movement of an object, generator circuit means including ground texture circuit means operative to cyclically generate a first predetermined set of signals, means for coupling said first predetermined set of signals to the display unit, and means in said display unit responsive to said signals to provide a plurality of rows on the display, circuit means including means operative to cyclically generate a train of impulses, and means in said generator circuit means responsive to said train to separate the rows in the display into a plurality of symbols disposed in aligned spaced relation, random texture circuits for adjusting at least one symbol in each of a plurality of said rows laterally on the display relative to other symbols in the same rows, said random texture circuits comprising a plurality of channels, each of which includes at least one countdown circuit having counting means for counting a random number of pulses in each train less than the whole, and means for providing a command pulse responsive to the occurrence of said random number of pulses in each successive train, shift means responsive to each command pulse to generate a shift pulse, and means in said generator circuit means responsive to said shift pulse to effect lateral shifting of one of said symbols in at least one of said rows.

11. In a visual indicator system for providing a display of different items of information on a display unit concerned with the relative movement of an object having generator circuit means including ground texture circuit means for providing a plurality of rows on the display, circuit means operative to generate a train of impulses, and means in said generator circuit means responsive to said train of impulses to separate each row on the display into a plurality of symbols disposed in aligned, spaced relation, the improvement comprising random texture circuit means including input means over which each train of impulses generated by said circuit means is received, countdown means including counting means operative to count a predetermined number of pulses in each train, and means responsive to the count of a predetermined number of pulses to provide a command pulse, shift circuit means for generating a shift signal, including means responsive to receipt of the command pulse to initiate generation of a shift pulse for the symbol to be shifted, means for coupling the following impulse in the train which occurs subsequent to the countdown impulse to said shift circuit means, means in said different circuit means responsive to said followimpulse to terminate generation of said shift pulse, means for coupling said shift pulse to the ground texture circuit means, and means in said ground texture circuit means responsive to said shift pulse to effect lateral adjustment of at least one symbol from each of a plurality of said rows.

12. An indicator system as set forth in claim 11 in which said shift circuit means comprises a bistable multivibrator circuit operable between a first and a second condition to generate a square wave shift pulse, a first and second input circuit for said multivibrator means responsive to receipt of said command pulse over said first input circuit to operate said multivibrator circuit from one stable condition to a second stable condition, means for coupling said train of pulses to said second input circuit, means in said multivibrator for operating said multivibrator back to the first stable condition responsive to the occurrence of the pulse in the train subsequent to the selected pulse, and output means for generating a square wave shift pulse responsive to said operation between said condition.

13. An indicator system as set forth in claim 11 in which said input means comprises means for providing a sync impulse for the leading edge of each impulse in said train, and means for concurrently coupling said sync impulses to said countdown means and to said shift circuit means.

14. An indicator system as set forth in claim 11 in which said train of impulses comprises a train of sine wave impulses, and said input means comprises shaper means responsive to each sine wave impulse to generate a square wave impulse, and a master blocking oscillator coupled to said shaper means for generating a sync impulse which is representative of the leading edge of each square wave impulse, and means for concurrently coupling said sync pulses to said countdown circuit.

15. An indicator system as set forth in claim 11 in which said countdown means comprises an input circuit over which each train of impulses is received, a double base diode transistor having one section thereof coupled to said input circuit, capacitor means, a charging circuit which is enabled during the period of receipt of the incoming train of pulses, and a discharge circuit for said capacitor means which is completed only responsive to the occurrence of an impulse in said train and the occurrence of a potential on said capacitor means which is of a value to enable the second section of said double base diode, and an output circuit for coupling a command impulse to said shift circuit means responsive to the discharge of said capacitor means.

16. An indicator system as set forth in claim 11 in which said shift circuit means includes means for providing a square wave shift pulse for each command pulse, a mixing circuit for mixing the square wave shift signal with a sawtooth wave which occurs at the rate of the vertical trace of the display, and means in said generator circuit means responsive to the resultant signal to effect increasing lateral displacement of the selected symbol in its movement to successive positions on the display.

17. In a visual indicator system for displaying different items of information on a display unit concerning the relative movement of an object, generator circuit means including means for providing the display of a path outline on the raster, and symbol generating means for separating said path into a plurality of symbols having a different spacing between successive ones of said symbols in said path.

18. In a visual indicator system for displaying different items of information on a display unit concerning the relative movement of an object, generator circuit means including means for providing the display of a path outline on said display unit, symbol generating means for separating said row into a plurality of symbols disposed in aligned, spaced relation, the spacing between successive symbols in the row being different, and means for selectively adjusting the spacing between the successive symbols in a row to different values.

19. In a visual indicator system for displaying different items of information on a display unit concerning the relative movement of an object, generator circuit means for providing the display of a path outline on the raster, symbol generating means operative to generate a set of signals, means in said generator circuit means responsive to said set of signals to separate said row into a plurality of symbols disposed in aligned, spaced relation, the spacing between successive symbols in the row being different, and means for selectively adjusting the size of the symbols in the row to different values.

20. In a visual indicator system for displaying different items of information on the raster of a display unit concerning the relative movement of an object, generator circuit means including means for effecting the display of a path outline on said raster, symbol generating means for generating a set of signals, means in said generator circuit means responsive to said signals to separate said row into a plurality of symbols disposed in aligned spaced relation, the spacing between successive symbols in the row being different, and means for adjusting frequency of generation of said signal set to a multiple of the frequency of the raster trace to thereby effect movement of said spaced symbols across the display.

21. In a visual indicator system for displaying different items of information on the raster of a display unit concerning the relative movement of an object, generator circuit means including means for effecting the display of a path outline on the raster, symbol generating means operative to generate a set of symbol producing signals, means in said generator circuit means responsive to said symbol producing signals to separate said row into a plurality of symbols disposed in aligned spaced relation, the spacing between successive symbols in the row being different, horizon line circuit means for generating a base line trace on said display, and sync means for initiating the generation of said set of symbol producing signals concurrently with the trace of said base line in each raster trace.

22. In a visual indicator system for displaying different items of information on a display unit concerning the relative movement of an object, generator circuit means comprising a first circuit means operative to provide the outline of a path which extends across at least a portion of the display on the display unit, oscillator circuit means including a frequency modulation oscillator for providing a train of output signals, modulating means for adjusting the frequency of the signals in said train, and means in said generator circuit means responsive to said train of frequency signals to separate the path into a plurality of symbols disposed in aligned spaced relation, the spacing between successive symbols in the row being determined by the difference in spacing between the impulses in said frequency modulated impulse train.

23. An arrangement as set forth in claim 22 in which said modulating means comprises a sawtooth generator circuit for providing a sawtooth waveform signal having a frequency rate which is related to the frequency of the raster trace and an amplitude which related to the changes in certain conditions of the object.

24. In a visual indicator system for displaying different items of information on a display unit concerning the relative movement of an object, generator circuit means for providing the outline of a path which extends across at least a portion of the display area on the display unit, oscillator circuit means including a frequency modulation oscillator for providing a train of signals, modulating means for providing signals of different frequency in said train, means in said generator circuit means responsive to said train of signals to separate the path into a plurality of symbols disposed in aligned spaced relation, the spacing between successive symbols in the row being determined by the difference in spacing between the impulses in the frequency modulated impulse train, and a second oscillator circuit means for controlling the phase of said frequency modulation oscillator circuit at least once during each raster trace on the display.

25. In a visual indicator system for displaying different items of information on a display unit concerning the relative movement of an object, generator circuit means including a first circuit means for providing the outline of a path which extends across at least a portion of the display area on the display unit, oscillator circuit means including a frequency modulation oscillator for providing a train of signals, modulating means for providing signals of different frequencies in said train, a local oscillator circuit, mixer means for deriving a difference frequency output from the output signals of said frequency modulation oscillator and said local oscillator circuits, means for coupling the derived signals to said generator circuit means, and means in said generator circuit means responsive to said train of frequency signals to separate the path into a plurality of symbols disposed in aligned spaced relation, the spacing between successive symbols in the row being different and determined by the difference in spacing between the impulses in the frequency modulated impulse train.

26. An indicator system as set forth in claim 25 in which said generator circuit means includes a second circuit means for providing the outline of at least one additional path on said display which is spaced from said first path, inverter means coupled to said mixer means for generating an inverted signal train, and means in said second circuit means responsive to said inverted signal train to separate the second path into a plurality of symbols related to the number of signals in said inverted train.

27. In a visual indicator system for displaying different items of information on a display unit concerning the relative movement of an object, generator circuit means for providing the outline of a path which extends across at least a portion of the display area on the display unit, oscillator circuit means including a frequency modulation oscillator for providing a train of signals, modulating means for controlling said frequency modulation oscillator to provide a train including signals of different frequencies, means in said generator circuit means responsive to said train to separate the path into a plurality of symbols disposed in aligned spaced relation, the spacing between successive symbols in the row being different and determined by the difference in spacing between the impulses in the frequency modulated impulse train, horizon line generator means for providing a base line on said display, speed oscillator means for providing signals representative of the speed of said object, and gate means responsive to the generation of a base line to gate a burst of phase stabilizing signals from said speed oscillator circuit to said frequency modulation oscillator.

28. In a visual indicator system for displaying different items of information on a display unit concerning the relative movement of an object, generator circuit means for providing the outline of a path which extends across at least a portion of the display area on the display unit, oscillator circuit means including a frequency modulation oscillator, modulating means comprising waveform generator means for coupling a variable amplitude signal to said frequency modulation oscillator, means in said frequency oscillator responsive to said variable amplitude signal to provide a train of pulses for each trace which have different spacings between successive symbols in the train, means in said generator circuit means responsive to said train to separate the path into a plurality of symbols disposed in aligned spaced relation, the spacing between successive symbols in the row being different, horizon line generator means for providing a base line on said display, and means for synchronizing the signal output of said waveform generator means and said frequency modulation oscillator to the time of generation of said base line.

29. In a visual indicator system for displaying different items of information on a display unit concerning the relative movement of an object, generator circuit means comprising a first and a second channel, a first generator circuit means in said first channel operative to provide the outline of a first plurality of paths, each of which extends across at least a portion of the display, and a second generator circuit means in said second channel for providing the outline of a second plurality of paths, oscillator circuit means operative to provide a first signal train having signals of different frequencies, means in said first circuit means responsive to said train to separate each of the rows provided thereby into a plurality of symbols, means for deriving a second signal train from said first signal train which is shifted in phase relative to said first train, and means in said second circuit means responsive to said second train to separate each of the rows provided by the second circuit means into a plurality of symbols.

30. In a visual indicator system for displaying different items of information on a display unit concerning the relative movement of an object, generator circuit means comprising a first and a second channel, a first circuit means in said first channel for providing the outline of a plurality of paths on said display unit, and a second circuit means in said second channel for providing the outline of a second plurality of paths on said display unit, oscillator circuit means operative to provide a first signal train having signals of different frequencies, means in said first circuit means responsive to said train to separate each of the rows provided thereby into a plurality of symbols, means for deriving a second signal train from said first signal train which is shifted in phase relative to said first train, means in said second circuit means responsive to said second signal train to separate each of the rows provided thereby into a plurality of symbols, random texture circuit means for each channel each of which includes input means for receiving the signal train which is generated for its associated channel, countdown means including means for selecting a pulse from the signal train in a random manner, means for providing a command pulse responsive to the occurrence of the selected pulse in each successive train, and shift circuit means responsive to said command pulse to couple a shift pulse to the generator circuit means in its associated channel.

References Cited in the file of this patent

UNITED STATES PATENTS

| | | |
|---|---|---|
| 2,292,045 | Burnett | Aug. 4, 1942 |
| 2,568,927 | Morrison | Sept. 25, 1951 |